(12) United States Patent
Abutaleb et al.

(10) Patent No.: US 7,068,971 B2
(45) Date of Patent: Jun. 27, 2006

(54) SYSTEM AND METHOD FOR INMARSAT CAPACITY EXPANSION AND CONTROL

(75) Inventors: Mohammed Gomma Abutaleb, Potomac, MD (US); Jeffrey Richard Jacobson, Bethesda, MD (US); Danny Edward McConnell, McLean, VA (US); James C. Crichton, Derwood, MD (US); Glenn Stephenson, III, Potomac, MD (US)

(73) Assignee: Innovative Communications Technologies, Inc., Gaithersburg, MD (US)

( * ) Notice: Subject to any disclaimer, the term of this patent is extended or adjusted under 35 U.S.C. 154(b) by 435 days.

(21) Appl. No.: 09/885,580

(22) Filed: Jun. 19, 2001

(65) Prior Publication Data

US 2002/0009059 A1    Jan. 24, 2002

Related U.S. Application Data

(60) Provisional application No. 60/212,793, filed on Jun. 19, 2000.

(51) Int. Cl.
*H04B 7/185* (2006.01)
(52) U.S. Cl. .............. 455/3.02; 455/430; 455/12.1
(58) Field of Classification Search ............. 455/3.02, 455/12.1, 427, 428, 429, 430, 13.1–4; 343/882
See application file for complete search history.

(56) References Cited

U.S. PATENT DOCUMENTS 5,481,592 A * 1/1996 Azer ..................... 455/12.1
5,915,020 A * 6/1999 Tilford et al. ............. 455/3.02
6,239,767 B1 * 5/2001 Rossi et al. ................ 343/882
2003/0133423 A1 * 7/2003 LaDue ..................... 370/330

OTHER PUBLICATIONS

Evans JV, Satellite Systems For Personal Communicaiotns, Proceedings Of The IEEE, vol. 86, No. 7, Jul. 1998, pp. 1325-1341.*
INMARSAT/Dale Irish. "Inmarsat-B," pub.at www.inmarsat.org. (1 page).
INMARSAT/Derek Tam. Inmarsat high-speed data services, pub. at www.inmarsat.org (2pp.).
COMTECH. "SDM-300L Satellite Modem" data sheet. Pub. at www.comtechefdata.com (2pp.).
Nera Marketing Brochure for Saturn Bm (4pp.).
Stratos Press Release on Best Service (2 pp.).
INMARSAT/Dale IRISH. "Inmarsat-B." pub.at *www.inmarsat.org*. (1 page).
INMARSAT/Derek TAM. Inmarsat high-speed data services, pub.at *www.inmarsat.org.*(2pp.).
COMTECH. "SDM-300L Satelite Modem" data sheet. Pub. at *www.comtechefdata.com*(2pp.).

* cited by examiner

*Primary Examiner*—Tilahun Gesesse
*Assistant Examiner*—Philip J. Sobutka
(74) *Attorney, Agent, or Firm*—George E. Darby

(57) ABSTRACT

The Inmarsat Capacity Expansion invention, in an embodiment to retrofit a standard Inmarsat-B mobile earth station (MES), combines standard MES equipment and functionality with an assembly containing a diplexer/switch and a digital signal processor, a second SCPC modem that has configurable modulation and error correction capabilities, control signals and paths, and related management and control software and hardware to enable the transmission and reception of standard service types and higher data rate services.

32 Claims, 19 Drawing Sheets

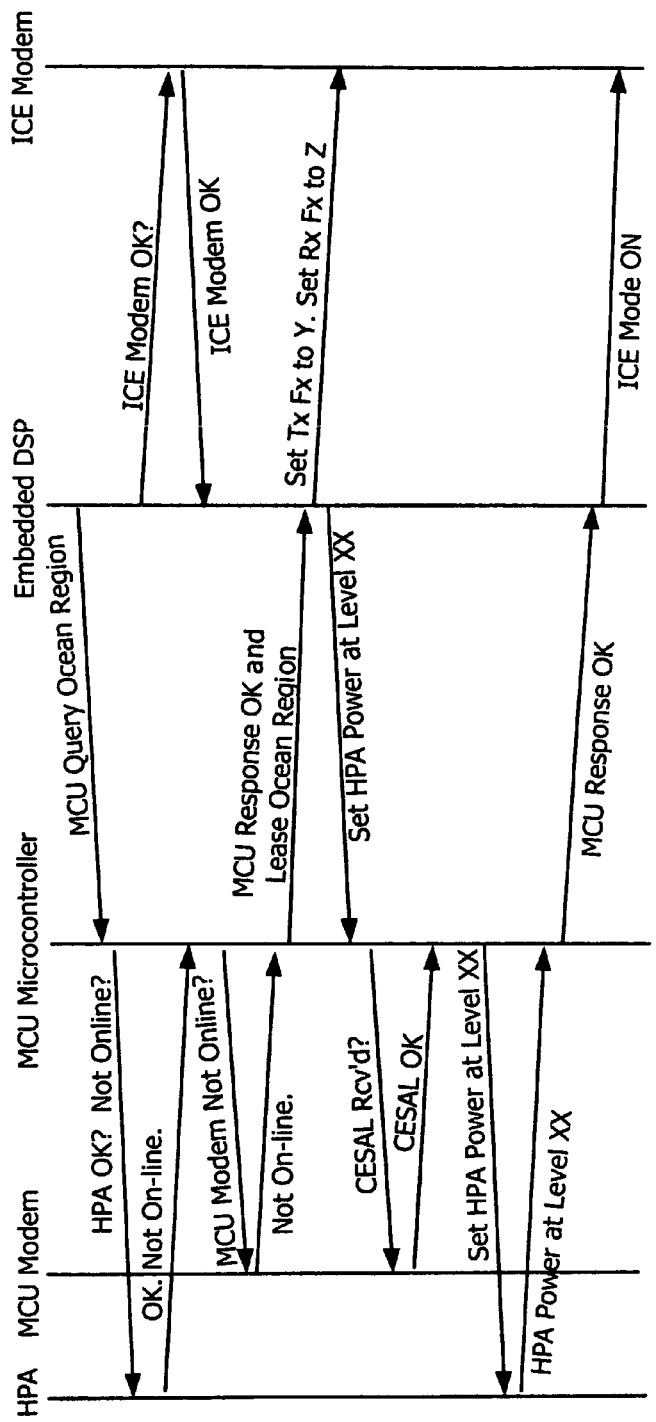

SYSTEM AND METHOD FOR INMARSAT CAPACITY EXPANSION AND CONTROL

RELATED APPLICATIONS

This application claims the benefit of the provisional patent application, Ser. No. 60/212,793 filed on Jun. 19, 2000, in the U.S. Patent and Trademark Office for an invention entitled "Inmarsat Capacity Expander".

BACKGROUND OF THE INVENTION

1. Field of the Invention

The Inmarsat Capacity Expander ("ICE") invention is an improved means of digital microwave communications, particularly microwave communications using satellite transponder capacity leased on a "power/bandwidth" basis. For instance, the ICE invention is able to provide higher data rates using a given radio frequency ("RF") bandwidth under transponder capacity leases on International Marine Satellite Organization ("Inmarsat") satellites compared with the data rates of existing Inmarsat-B High Speed Data ("HSD") capable satellite terminals. The ICE invention also includes an innovative management system that enables the use of ICE equipment with a non-real-time management and control channel and, optionally, with a real-time management and control channel.

Inmarsat provides dial-up services and a small amount of leased capacity on its "operational satellites" and provides only leased capacity on "lease satellites." Operational satellites are in different orbital locations from lease satellites. Typically, for "dial-up" services on operational satellites, a land earth station operator ("LESO") purchases minutes of usage from Inmarsat "as-used", sells minutes of usage "as-used" to end-users on a call duration basis (by the minute), and pays Inmarsat after usage is incurred. A LESO typically offers "dial-up" or "on demand" satellite services on a demand-assigned basis between (i) fixed (land-based) facilities (each known as a land earth station, or "LES") and (ii) marine, land-mobile, or airborne earth stations (each known as a mobile earth station, or "MES") that comply with Inmarsat specifications. Customers of "dial-up" services use Inmarsat services for periodic calls, e.g., for individual calls or data sessions.

A LESO can also offer another service that allows customers to "lease" full-period, power/bandwidth "slots" with specific frequency boundaries on Inmarsat satellite transponders. For example, a LESO might purchase a long term lease of 400 kHz bandwidth and 26 dBW power from Inmarsat on a lease satellite, reserve 50 kHz bandwidth and 17 dBW power of the lease for shared occasional use or short term subleases (as opposed to paying Inmarsat for "as used" minutes on Inmarsat's dial-up service), and sublease the remaining power and bandwidth to LESO customers for long term subleases and private uses. Power/bandwidth leases and subleases are typically allocated to a customer on a full-time basis, with no contention for access to the leased slot from other Inmarsat or LESO customers. Power/bandwidth leases and subleases are collectively called "leases" herein. Remote terminals compliant with Inmarsat A, B, M4, and F specifications installed on vehicles, vessels, or aircraft and similarly compliant fixed remote terminals operating in leased mode can generally support a data rate of no more than 16 kbps in each 25 kHz slot of leased bandwidth. A slot leased on a power/bandwidth basis typically incurs charges computed based on the satellite RF transmission power and/or the transponder bandwidth used. There is unmet market demand for technologies that can obtain higher throughput while operating within a given power/bandwidth. Typically, for lease services, a LESO purchases satellite transponder capacity from Inmarsat in 25 kHz, 14 dBW increments on one or more Inmarsat satellites and resells that capacity to end-users.

An overriding concern of Inmarsat and other satellite system operators is that customers accessing a satellite shall not interfere with other customers. MES equipment must therefore meet strict performance criteria with regard to transmission center frequencies, bandwidth and power.

2. Description of Related Art

Art related to using, managing, and controlling Inmarsat services will first be described, followed by comments that generalize the application of such art to satellite and microwave communications systems.

An Inmarsat B ("Inmarsat-B") MES terminal typically comprises an MES control unit ("MCU"), an RF terminal, and an RF cable between the MCU and RF terminal. Inmarsat MES terminals use a frequency band of 1626.5 to 1649.5 MHz for uplink and a frequency band of 1526.5 to 1546.5 MHz for downlink. The principal components of an MCU include a single carrier per channel ("SCPC") satellite modem, an embedded microcontroller, telephone handset, voice codec, serial data input/output ("DTE I/O") port, and standard management and control ("M&C") software. An external power supply provides DC power to the MCU. The principal components of the RF terminal ("RFT") are an antenna, an optional antenna controller, a Low Noise Amplifier ("LNA") and a high power amplifier ("HPA"). User inputs to the MCU are through a telephone handset or a serial data port. Output from the satellite modem in the MCU is an L-band RF transmit carrier which is then multiplexed with M&C carriers and DC power. The "standard M&C channel" controls the HPA and antenna; the DC powers the HPA and the optional antenna controller. The satellite modem modulator output, fed through the cable, drives the HPA, and the HPA drives the antenna RF elements. Signals received at the antenna RF elements are fed from the antenna through the LNA and diplexed onto the RF cable (the same cable that carries the L-band RF transmit carrier, M&C and DC power to the RF terminal) to the demodulator section of the satellite modem. In a ship-borne MES (also known as a "maritime MES" or "marine MES"), the MCU is known as below decks equipment ("BDE") and the RF terminal is known as above decks equipment ("ADE"). An airborne MES is also known as an "aero MES", and a land-based MES is also known as a "fixed MES" or "land mobile MES" or "transportable MES". The term "path" means a route over which communications is provided by electromagnetic means, provided, however, baseband paths may alternatively use optical means. A "traffic path" is a path over which user payload or traffic is carried. A "control path" is a path over which M&C messages are carried. The term "channel" means a method of exchanging messages between two devices using a common path and implies that the path may be shared with other types of messages or user traffic. The term "channel" used in connection with encrypted configuration codes and other message types exchanged with remote terminals, as described below, also includes delivery by means other than data communications networks, such as mail, fax, telex, telegram, oral, etc. The term "user" means an end user, such as a customer of a LESO, as opposed to personnel operating equipment at an LES. "On-line" means an earth station is actively transmitting a carrier over a traffic path. "Off-line" means an earth station is not actively transmitting a carrier over a traffic path. "Local" means a function or device associated with an end-user's site, e.g., a remote terminal. "Local" is contrasted with activities associated with a site not operated by an end-user, such as an LES.

The standard information technology associated with an Inmarsat-B LES includes computers and software that allocate uplink and downlink frequencies based on call requests, users' contract rights, bandwidth availability, etc., as provided for in Inmarsat specifications for Inmarsat-B operations. The Inmarsat-B management system includes a Network Coordination Station ("NCS") for each ocean region and Access Control and Signaling Equipment ("ACSE") at each LES and NCS. Each ACSE in an ocean region has network connectivity with the NCS for that ocean region, and exchanges standard M&C messages with the NCS to support Inmarsat-B MES users served by a given LES. To use an operational satellite, an MES requests a MES/LES traffic path on a call by call basis by sending a call request through the ACSE at the NCS serving the MES. The NCS ASCE allocates capacity from the "pool" of dial-up frequencies reserved by Inmarsat ("Inmarsat Pool") and notifies the MES and the ACSE at the LES serving the MES of the frequency assignments for the requested call. When the call becomes active, the LES ACSE and the MES M&C functions communicate via a standard M&C in-band channel until the call hangs up. When the call hangs up, the LES ACSE notifies the NCS ACSE and releases the frequencies back to the Inmarsat Pool. In the call setup process, the MES notifies the NCS ASCE of the "service type" (e.g., voice, fax, 9.6 kbps data, HSD) being requested and the NCS ACSE and LES ACSE manage resources accordingly. The software built into the MCU configures the standard modem to match the service type. Similarly, the LES ACSE configures the modems (also known as "channel units") at the LES to match the service type. For standard dial-up service (voice, fax, 9.6 kbps data, and HSD), a given NCS ACSE manages an Inmarsat Pool of RF carrier center frequencies for traffic paths on operational satellites serving a given ocean region, and the LESO is billed by Inmarsat based on the number of call minutes used.

To use a lease satellite, the LES ACSE acts as a "standalone NCS ACSE" and performs the functions of the NCS ACSE for carrier frequencies within the transponder spectrum leased and managed by that LES ACSE. Standard lease mode use of a lease satellite begins with a call request from an MES to the LES ACSE. The LES ACSE replies to the MES with frequency assignments for the requested lease mode. When the "lease mode call" becomes active, the LES ACSE and the MES M&C functions communicate via a standard M&C in-band channel until the call is dropped (torn down) or until the expiration of the sublease term or of the lease term (when the capacity allocation assigned by Inmarsat to the LES ACSE expires). For HSD lease services, a LESO's ACSE manages a pool of RF carrier center frequencies within the spectrum leased by the LESO, and Inmarsat invoices the LESO at a fixed monthly rate for the power and bandwidth resource that has been allocated to the LESO.

An Inmarsat-approved MES providing dial-up services contains a satellite modem that operates in different modes to meet requirements for remote terminal registration, for call signaling and supervision, and for transmission of user traffic for the various standard services. The modem operates as a random access time division multiple access ("RA/TDMA") transmitter to send registration messages to the relevant NCS ACSE, and to send call requests to the NCS ACSE, as described above. Dial-up standard services use operational satellites and are voice (10 or 20 kHz bandwidth), 9.6 kbps data (20 kHz bandwidth) and HSD (64 kbps data, 100 kHz slot) ("Standard Services in dial-up mode"). The modem in a standard MES monitors a 6 kbps time division multiplexed ("TDM") channel when not transmitting ("idle" or off-line) to listen to the NCS ASCE (dial-up service on operational satellites) or LES ASCE (NCS failure or lease services on lease satellites) for instructions. When on-line, the modem multiplexes (in the uplink) and demultiplexes (from the downlink) an in-band signaling channel in the SCPC carrier to support signaling and supervision messages to and from the LES ACSE. Counterparts of the equipment and functions described for an MES, adapted for the LES environment, are used at each LES to establish a traffic path between an LES and an MES. For instance, an LES sends an LES to MES dial-up call request to the NCS ACSE over an NCS RA/TDMA carrier (allocated for signalling of LES to MES call requests between the LES ACSE and the NCS ACSE). The NCS ACSE then uses the TDM carrier monitored by the MES, and the TDM carrier monitored by the LES ACSE to send a notification to the MES and to the LES ACSE of the allocated frequencies for the call. The LES is sometimes called a coastal earth station ("CES"). A CES or LES providing leased services is called a "lease gateway".

The satellite modem in an Inmarsat-approved MES that provides leased services operates not only in dial-up modes, but also in additional modes necessary for leased services. HSD (64 kbps) service is the only standard Inmarsat lease mode ("Standard Services in lease mode"). To enter lease mode, an Inmarsat-B MES monitors a "bulletin board channel" on an operational satellite to learn the frequency of "Coastal Earth Station standAlone Lease" ("CESAL") TDM carriers on each Inmarsat "lease satellite". Based on the data received in the bulletin board channel and configuration information provided by the user that specifies the lease satellite and the lease gateway, the MCU in maritime and aero MESs repositions the antenna to point at the specified lease satellite (the user of most land mobile MESs must manually reposition the MES antenna), and tunes the MCU receiver to the CESAL carrier. If the MCU receives the appropriate message on the CESAL carrier, it will configure the modem and other electronics for leased mode operation. All standard Inmarsat-B services (dial-up and lease) use the same call set-up procedure. In standard lease mode, the MES uses call request procedures similar to those available on operational satellites, however, carrier assignment is provided by the specified lease gateway operating independently, rather than by an Inmarsat NCS. After receiving the selected CESAL carrier and entering lease mode, the user establishes a call via various methods available to a given MES, and upon receiving a carrier assignment via signalling carriers from the standalone ACSE, the MCU switches to data mode and turns on the MES HPA. To stay in leased mode, the MCU must constantly receive the correct CESAL carrier. If the MCU does not receive the correct CESAL carrier, or if user reconfigures the terminal to exit lease mode, the MCU turns off the HPA. More detail on the procedures and specifications for Inmarsat services and equipment, including Inmarsat-B MES and LES specifications, is available from Inmarsat, 99 City Road, London, England (www.inmarsat.org). Standard M&C signal paths are "in band", that is, standard M&C messages share the path that is also used by payload traffic between an MES and an LES. It is possible to use non-standard peripheral equipment at a lease gateway and at an MES served by the lease gateway to provide a non-standard service if such peripheral equipment can be correctly configured and managed through an M&C channel external to standard control signal paths. Standard Services in dial-up mode and Standard Services in lease mode are collectively called, "Standard Services".

Leased bandwidth on Inmarsat satellites is very expensive, and standard data rates are slow. Several types of standard Inmarsat MESs, in particular, Inmarsat-B MESs, use relatively inefficient fixed rate forward error correction ("FEC") to encode and decode bitstreams for transmission in a widely diverse environment. An Inmarsat-B standard MES in lease mode provides a throughput of 64 kbps in 100 kHz of leased bandwidth. Higher data rates for a given bandwidth have been long sought. Although there is certainly demand for higher data rates, several substantial problems have hindered improvements, as follows:

Earth stations (both LES and MES) must have the ability to handle standard dial-up calling as well as leased services. Many ships only have a single MES, which must be available on short notice for emergency calls. If an LES channel unit or MES could provide higher data rates than are possible with Standard Services in lease mode, the LES channel unit or MES must be responsive to commands to revert from "enhanced leased operation" to Standard Services mode on short notice.

There are over 10,000 MESs currently installed on ships. For commercial success, a method of enhanced lease operation must be a retrofit of only the below decks equipment of an installed MES. A retrofit must not disturb those parts of an MES, such as the standard modem and the HPA, that have received Inmarsat certification as compliant with Inmarsat standards ("type approval"). Retrofitting presents significant problems in how to switch between two modems, yet ensure that the MCU receiver constantly receives CESAL carrier during enhanced lease operation.

Standard services drive the HPA with characteristic waveforms that are monitored by the MCU. Any combination of modulation methods, forward error correction, and data compression used to obtain higher data rates must result in a waveform that is compatible with the standard HPA included as part of a type approved Inmarsat terminal. For instance, many Inmarsat-B MCUs drive the HPA with a constant envelope waveform to provide Standard Services in lease mode. To avoid conditions that would cause such Inmarsat-B MCUs to turn off the HPA, enhanced lease operations must also drive the HPA with a constant envelope waveform.

To coordinate the use of standard and higher speed transmission paths among standard and retrofitted earth stations in a given network, a management system is required. For operational flexibility and efficiency, a method of enhanced lease operation should include a standalone management system that does not require a real-time, interactive connection between and MES and a network management computer. An MES in lease mode often stays in lease mode for the full period of the lease, which can be for years. A real-time, interactive management channel would needlessly consume precious bandwidth during long periods when no management is needed, and require a second real-time authorization and management network (in addition to the authorization and management network for Standard Services). If, however, an MES is used alternately for dynamic or reconfigurable lease services where capacity is allocated based on demand, a real-time, interactive M&C channel would be helpful.

Standard Inmarsat-B HSD supports only a 64 kbps path in a 100 kHz slot. Some Inmarsat-B users require full-period (constant) connectivity but employ data rates of less than 64 kbps. Such users must currently lease an entire 100 kHz slot to obtain full-period connectivity, even though they do not need a 64 kbps data rate. Some Inmarsat-B users have a need for asymmetric services in which two or more Inmarsat-B MESs share given leased bandwidth (one or more slots), and the transmit and receive data rates and bandwidths within the leased slot(s) are different for different Inmarsat-B MESs. However, asymmetric services are impossible using standard Inmarsat-B MESs. There are unmet demands for asymmetric services and for a full-period service that provides lower data rates, uses less bandwidth, and costs less than Inmarsat-B HSD service.

There have been unpublished efforts using peripheral equipment interfaced to an Inmarsat-B MES to solve the preceding problems and to achieve higher data rates. The results of these efforts to date, however, are systems that require a dedicated local personal computer ("PC") as a site controller, real-time M&C channels between an MES and the LES, and transmission from the LES over the real-time M&C channels of all configuration commands and parameters (e.g., start time/stop time, ocean region configurations, and power level vs. data rate settings). These systems also problematic in that they may provide unlimited local user control of critical modem parameters.

A better solution to the preceding problems would be a system that does not require a real-time M&C channel, stores configuration commands and parameters locally, does not require a dedicated local PC, denies local user control of critical modem parameters, seamlessly supports dial-up, standard lease, and enhanced (higher data rate per given bandwidth) lease operations, and can be retrofitted on the huge installed base of MESs. The ICE invention not only solves these problems in the context of Inmarsat, but can be used to obtain higher data rates in other types of microwave transmission sold on a power/bandwidth basis. In a 100 kHz Inmarsat-B slot, an ICE-enabled MES can support approximately twice the datarate (128 kbps) compared with a standard MES (64 kbps). Moreover, ICE-enabled capacity is scalable. For instance, an ICE-enabled MES can support approximately 32 kbps in a 25 kHz Inmarsat-B slot and thereby provide greater efficiency of space segment utilization for applications that do not require high speed service. Alternatively, an ICE-enabled MES can support approximately 256 kbps in a 200 kHz Inmarsat allocation if an even higher data rate is required.

SUMMARY OF THE INVENTION

The ICE invention, in an embodiment to retrofit a standard Inmarsat MES, comprises, in addition to the standard MES equipment and functionality discussed above, a second SCPC modem with configurable modulation and error correction capabilities together with an assembly containing a diplexer/switch and a digital signal processor ("DSP Board"), control signals and paths, and related management and control ("ICE M&C") software and hardware that enable the transmission and reception of Standard Services and higher data rate services. In this embodiment, an ICE-enabled MES can transmit and receive in either Standard Services or ICE mode, but not both modes, at a given time.

An embodiment of ICE designed to retrofit a standard Inmarsat-B MES ("Inmarsat-B ICE MES Retrofit") supplements the standard MES equipment with a second SCPC modem ("ICE Modem") equipped with configurable FEC and concatenated Reed-Solomon error correction (or if available on the second SCPC modem, even more efficient error correction methods, such as "Turbo FEC"), a DSP Board (normally mounted inside the ICE Modem), and an ICE M&C system that uses encrypted messages. Standard Services are supported by standard inputs (telephone, fax, serial data) to the MCU, while a range of datarates higher, equal to, and lower than 64 kbps ("ICE Services") is supported by connecting user equipment to the baseband I/O ("DTE I/O") port of the ICE Modem. This embodiment of the ICE invention offers a range of data rates without being restricted to the "service types" defined by Inmarsat. In this embodiment, the L-band port of the MCU is fed to a first diplexer on the DSP Board, and the L-band ports of the ICE Modem are fed to a second diplexer on the DSP Board, as described in more detail below. For this embodiment, entry and exit frequencies on the DSP Board in the Inmarsat-B ICE MES Retrofit are L-band. The exit port of the DSP Board is connected via an RF cable to the HPA in the RF terminal. In the Inmarsat-B ICE MES Retrofit, the MCU controls the power level of the HPA in response to commands provided to the MCU from an embedded processor on the DSP Board.

The ICE Management System comprises at least one ICE server computer ("ICE Server") associated with each LES, ICE Server application software running on the ICE Server, an embedded computer on the DSP Board in each Inmarsat-B ICE MES Retrofit, M&C channels for exchanging messages between the ICE Server and the embedded computer, and management software running on the embedded computer that is specific for a given ICE embodiment. The ICE Management System can optionally include a server computer associated with the network operations center ("NOC Server") of a user of ICE Services. Each NOC Server has data connectivity with an ICE Server (called a "LES Server" in this distributed M&C network architecture), runs a subset of the ICE Server application software, and enables a user to manage directly certain "user configurable" elements of the user's ICE Services. The Inmarsat-B ICE MES Retrofit is configured by ICE M&C messages exchanged between an ICE Server (or optionally a NOC Server) and an Inmarsat-B ICE MES Retrofit through an M&C channel external to standard Inmarsat-B control paths. In an Inmarsat-B ICE MES Retrofit, local ICE management software ("Local ICE Management Program") runs on an embedded computer (in which the central processing unit is a digital signal processor or "DSP") on the DSP Board. The Local ICE Management Program runs on the DSP and interfaces the DSP with the MCU, the ICE Modem, and devices on the DSP Board. The DSP Board comprises an embedded computer (the DSP and associated buses, memory, and support chips), two diplexers, two switches, support devices such as splitters and filters, and control and RF signal paths. The Local ICE Management Program controls whether the ICE mode of operation can be activated. Activation of ICE mode can be done manually or according to configuration(s) stored in non-volatile random access memory ("NVRAM") memory on the DSP Board and associated with the DSP.

In this embodiment, RF signal paths on the DSP Board in the Inmarsat-B ICE MES Retrofit use L-band frequencies. The multiplexed output of the MCU is connected to the entry connector on the DSP Board. On the DSP Board, between the entry connector and the entry switch, the multiplexed transmission path from the MCU is tapped by a low pass filter and passes through a directional coupler to an entry switch (the receive band of the L-band signal is tapped by the directional coupler, but L-band signals do not pass through the low pass filter). The standard M&C channel and DC power, but not the L-band transmit and receive signals, pass through the low-pass filter, a second low pass filter, and connect to a combining point described below that is on or near the exit connector. During periods in which the MCU is on-line providing Standard Services, ("ICE OFF mode"), the MCU transmit/receive channels, DC power to the RF terminal, and the standard M&C channel pass through two connectors (an entry connector and an exit connector), two switches (an entry switch and an exit switch) and a path interconnecting the switches on the DSP Board. In ICE OFF modes, the active components of the DSP Board are bypassed. When ICE mode is activated ("ICE ON" mode), the entry and exit switches on the DSP Board are thrown to insert the ICE Modem and other active components on the DSP Board into the RF path to the RFT. In ICE ON mode, the entry switch in the DSP Board connects the multiplexed output of the MCU to the diplexed port of a first diplexer in the DSP Board. The first diplexer separates the receive and transmit paths and connects them to receive and transmit ports, respectively, of the first diplexer. At the transmit port of the first diplexer, the standard MCU transmit path is terminated in a dummy load. In ICE ON mode, the ICE Modem transmit path is connected to the transmit port of a second diplexer. The diplexed port of the second diplexer is connected through the exit switch to the exit connector. Between the exit switch and the exit connector at a combining point (typically, a "T" connection on the exit connector side of the exit switch or on the exit switch itself), the diplexed transmit and receive path from the diplexed port of the second diplexer are combined with the standard M&C channel and DC power. The multiplexed path continues from the combining point through the exit connector on the DSP Board, via the RF cable, to the RFT. Because the standard M&C channel and DC power pass undisturbed through the DSP Board, the MCU can control the HPA and antenna during both ICE OFF and ICE ON modes.

During ICE ON mode, from the exit connector on the DSP Board, the receive path follows an RF path through the exit switch to the diplexed port of the second diplexer, and appears at the receive port of the second diplexer. The receive path is then amplified and feeds the receive port of the first diplexer, which diplexes the receive channel into the RF path that runs through the entry switch and the directional coupler to the MCU. The directional coupler between the entry connector and the entry switch on the DSP Board provides a branch of the receive path from the antenna. From the directional coupler, the branch receive path is amplified, filtered, passes through a second coupler, is amplified again, and then feeds the receive port of the ICE Modem. The tapped output of the second coupler in the branch receive path is amplified and provided to a receive monitor connector on the DSP Board. Maintaining receive path continuity during ICE ON mode from the RFT through the first and second diplexers on the DSP Board to the MCU enables the MCU to monitor the CESAL carrier during ICE ON mode. The DSP Board includes amplifiers in the MCU receive path to ensure that insertion of the active components of the DSP Board during ICE ON mode is virtually lossless as compared to ICE OFF mode.

In the Inmarsat-B ICE MES Retrofit, the ICE Modem uses a combination of forward error correction methods carefully designed to double data throughput without exceeding leased bandwidth or causing an MES error condition. Inmarsat standard HSD on an Inmarsat-B MES uses a rate 1/2 FEC and OQPSK to provide a 64 kbps data rate in a 100 kHz slot. The Inmarsat-B ICE MES Retrofit can use rate 7/8 FEC, OQPSK, and Reed-Solomon error correction (or rate 3/4 Turbo FEC if supported by the selected ICE Modem) to provide a 128 kbps data rate in a slot of approximately 100 kHz. Although the ICE carrier is approximately 20 kHz wider than the standard carrier in this example, the ICE carrier fits within the leased slot. If data rates are changed to meet different requirements, HPA power level is adjusted by the Local ICE Management Program.

The Local ICE Management Program polls the MCU for MES status, and controls the diplexer/switch directly and the HPA through messages to the MCU. To ensure compliance with Inmarsat policies, if the MCU detects an error condition in the MES (including the HPA), the MCU changes MES status from "OK" to an error message. The Local ICE Management Program can only acquire use of the ADE for ICE mode operations (and adjust the HPA power level for ICE ON mode) when MES status is "OK" and the standard modem is idle (not busy with a call). Prior to entering ICE ON mode, if the Local ICE Management Program detects an MES status of "error" or "standard modem busy," the Local ICE Management Program prevents entry into ICE ON mode. During ICE ON mode, if the Local ICE Management Program detects an MES status of "error" or "emergency call", or a user elects to make a standard dial-up call (e.g., a distress call via X.25 or telex) or uses a user interface to terminate ICE ON mode, the Local ICE Management Program turns off the ICE Modem carrier and reconnects the MCU directly to the ADE.

The Local ICE Management Program can receive instructions and configuration parameters either through a standalone (non-real-time) M&C channel or, optionally, through a real-time, interactive M&C channel. Real-time, interactive M&C channels are well known in the art and often use an in-band signaling channel (also known as an engineering service channel or "ESC") for exchange of M&C information. Typical ICE M&C configuration parameters include the start time and stop time of ICE mode of operation, HPA power level, time adjustments, transmit frequencies, receive frequencies and other parameters. Received ICE M&C configuration parameters are stored in NVRAM associated with the DSP on the DSP Board. Standalone management is more challenging, since instructions must be reduced to numbers that can be entered using a numeric keypad or even more basic user interfaces. The standalone version of the ICE M&C channel uses defined message formats, rigid syntax, and encryption to produce small sets of apparently random numbers that, when decrypted, are can be executed only by a given ICE Modem. The set of numbers can be faxed, phoned, mailed, telexed, telegraphed, emailed, etc., to a user. In the Inmarsat-B ICE MES Retrofit, the user enters the set of numbers contained in an ICE M&C message using the keypad of the ICE Modem or of the MCU telephone handset. The Local ICE Management Program decrypts the set of numbers to produce a set of configuration parameters, confirms the target of the configuration as the ICE Modem under the control of the DSP, and then stores the configuration information in NVRAM associated with the DSP. The DSP periodically queries the current configuration of the MCU and selects the appropriate configuration from NVRAM based on the ocean region setting for the MCU and the current date and time. The DSP also queries the current configuration of the ICE Modem and changes the configuration of the ICE Modem as needed to match the appropriately selected configuration stored in NVRAM.

At each LES providing ICE Services, an ICE Server runs ICE Server application software that manages and controls channel units that include satellite modems (each, an "ICE Channel Unit"), traffic paths, M&C paths and channels, and M&C messages associated with the LES and used to provide ICE Services. The ICE Server application software also generates encrypted ICE M&C messages that are sent to Inmarsat-B ICE MES Retrofits through standalone M&C channels or, optionally, through real-time, interactive M&C channels. ICE Server application software also reports usage of ICE Services to the LESO operating the LES and to the licensor of the ICE Server application software.

A second embodiment of the ICE invention combines the MCU and the ICE invention in a single unit for replacement of existing MCUs and for new installations. A third embodiment includes two ICE-enabled remote terminals in a redundant configuration. Embodiments specific to Inmarsat have been described above, but other embodiments of the ICE invention can be used in other environments in which microwave communications capacity is sold on a power/bandwidth basis, including satellite communications services sold by satellite system operators other than Inmarsat and in bands other than L-Band. The ICE Management System not only supports the use of the ICE invention in microwave communications services, but can be more broadly used for secure authorization and configuration of telecommunications and information technology, process engineering, surveillance, and other types of equipment.

BRIEF DESCRIPTION OF THE DRAWINGS

FIG. 6 illustrates a state table for acquisition of ADE by the ICE Management System.

FIG. 7 illustrates the messages exchange used to enter ICE ON mode.

DETAILED DESCRIPTION OF THE PREFERRED EMBODIMENTS

Embodiments of the ICE invention for RF communications combine various methods of modulation, forward error correction, and optional data compression, and ICE M&C channels to provide higher data rates in environments in which RF communications capacity is sold on a power/bandwidth basis. A standalone ICE M&C channel is integral to the ICE invention, and in-band ESC, or an external interactive, ICE M&C channels are optional in an ICE system. An "ICE telecommunications system" is at least two ICE embodiments sharing at least one transmit and one receive communications path and controlled by an ICE Management System. The ICE invention essentially turns leased, but unused, bandwidth into payload bandwidth. An interactive M&C channel just for ICE systems would require a network of authorization and management servers associated with LESs or NOCs, and of real-time M&C channels that largely duplicate the servers and channels used to authorize and manage Standard Services. To avoid the mandatory use of a duplicative management network, the basic ICE Management System uses non-interactive, standalone ICE M&C channels, as described below, to exchange M&C messages with ICE-enable remote terminals.

A specific embodiment of the ICE invention in the field of RF communications depends upon the modulation and forward error correction methods used in an installed base of terminals. In satellite communications, most installed bases of earth stations conform with performance standards promulgated by a satellite system operator or an international standards organization. Modulation and forward error correction methods determine the bandwidth efficiency of the installed earth stations, and whether an ICE embodiment can improve on that bandwidth efficiency. For instance, Inmarsat-B MESs in HSD mode use 80% of leased bandwidth for a given data rate. An Inmarsat-B ICE MES Retrofit delivers twice the data rate and uses 100% of the leased bandwidth. Obtaining such improved performance can incur two performance tradeoffs versus standard leased mode: additional delay attributable to some types of error correction (e.g., Reed Solomon), and somewhat reduced fade margins. These tradeoffs are generally acceptable given the doubling of the data rate in the same leased bandwidth.

Figure 1:
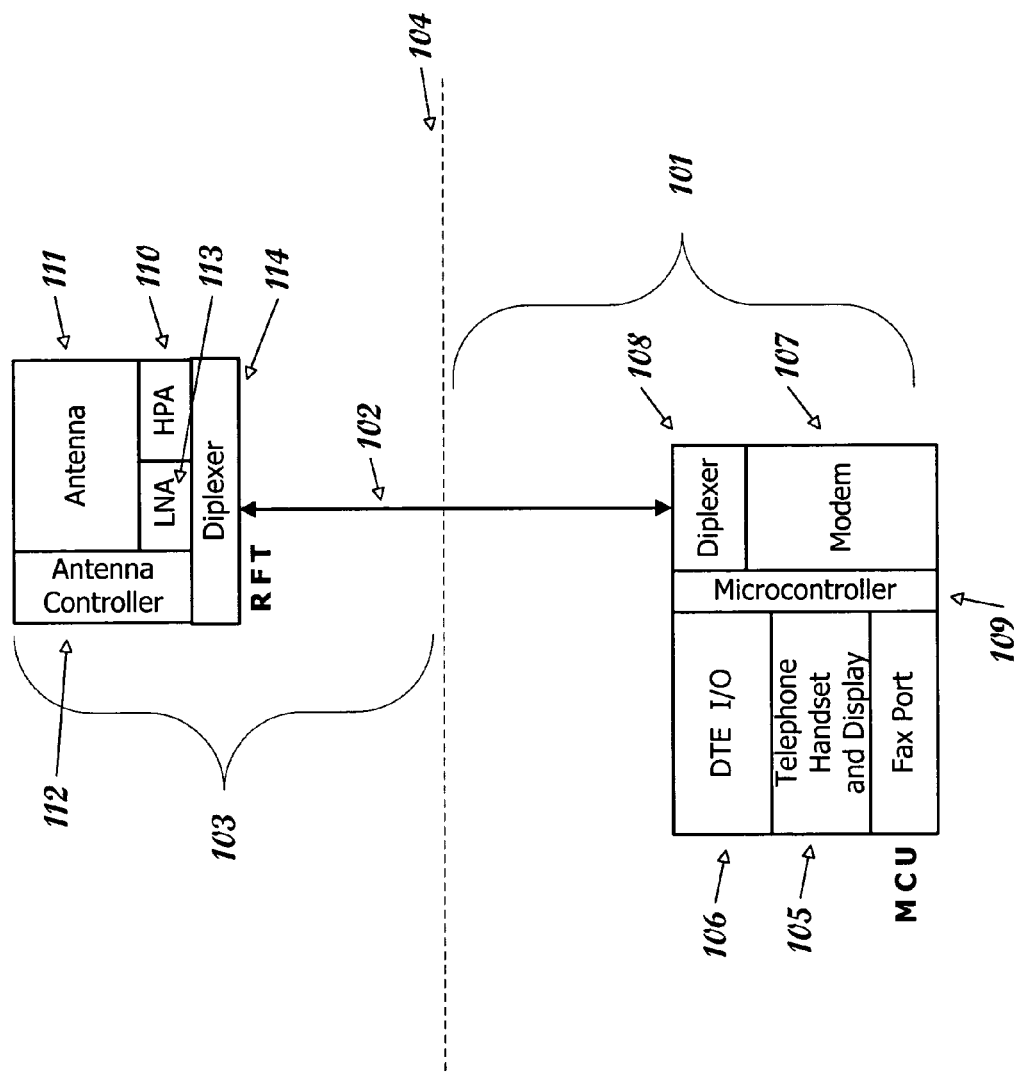
FIG. 1 illustrates an Inmarsat-B standard mobile earth station.

As shown in FIG. 1, Inmarsat-B MES below decks equipment (101) comprises an MCU and a portion of the RF cable (102). In a fixed MES, the BDE is also called "indoor equipment". The above decks equipment (103) comprises the RF terminal and the remainder of the RF cable (102). In a fixed MES, the ADE is also called "outdoor equipment". The demarcation (104) between BDE and ADE is the penetration through a deck or wall that separates interior space from exterior space. The MCU principally comprises: a telephone handset (105); baseband signal inputs and outputs, particularly serial data (106); an SCPC modem (107) with OQPSK modulation, rate 1/2 FEC, and L-band output; a diplexer (108), and an embedded microcontroller (109) running an operating system and a management software application. The RF terminal for a maritime MES principally comprises an HPA (110), antenna (111), antenna controllers (112), LNA (113) and diplexer (114). The MCU is connected to the RF terminal by the RF cable. The L-band transmit and receive signals, and standard M&C channel are multiplexed by frequency above the DC power on the RF cable. The Inmarsat-B hardware, software, and operating specifications for Standard Services, including the instruction and data sets of the embedded microcontroller in a standard Imnarsat-B MCU, are available from Inmarsat (www.inmarsat.org) and are incorporated herein by reference. When on-line over an operational satellite, an Inmarsat-B MES multiplexes an in-band signalling channel onto the SCPC carrier to provide continual communication to the LES of Inmarsat "Signalling Unit" messages, such as "connected/busy".

An Inmarsat-B ICE MES Retrofit is one of the preferred embodiments of the ICE invention. First, the Imnarsat-B ICE MES Retrofit, its counterpart at an LES, and standalone ICE Management System will be described in detail. Next, the single unit "Inmarsat-B ICE MES", and its counterpart at an LES, will be described, along with some ICE embodiments for other microwave communications environments. Finally, some additional embodiments of the standalone ICE Management System for use in the secure authorization and configuration of telecommunications, information technology, process engineering, and other equipment will be described.

Figure 2:
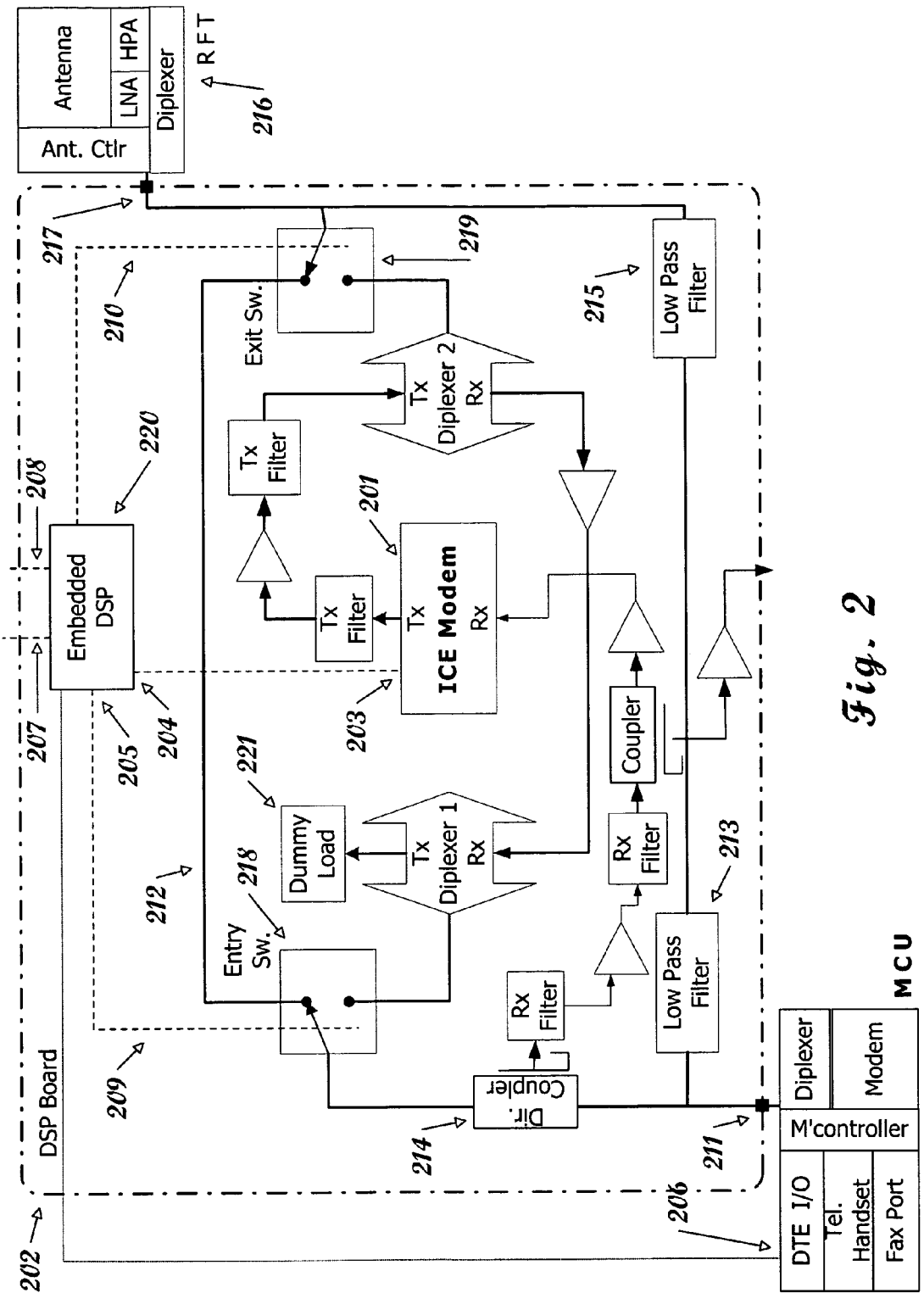
FIG. 2 illustrates the DSP Board, in ICE OFF mode.

As shown in FIG. 2, the Inmarsat-B ICE MES Retrofit supplements the standard Inmarsat-B MES equipment with a second SCPC modem (the "ICE Modem" or "external satellite modem" or "second satellite modem") (201) configured with Viterbi error correction e.g., rate 7/8 FEC) and concatenated Reed-Solomon error correction, a DSP Board (202), control signals and paths, and ICE M&C software and hardware. The ICE Modem normally used is an EFData SDM-300L-2 ("EFData 300L"), which supports various modulation methods, FEC rates, and Reed-Solomon error correction. The EFData 300L modem is manufactured by Comtech EFData, 2114 West 7th Street, Tempe, Ariz. 85281 (www.efdata.com). The EFData 300L modem case contains a cavity in which a power supply or other equipment can be mounted. The DSP Board is normally board-mounted and inserted in this cavity. The EFData 300L modem software includes an application programming interface ("API") that permits parameters, such as modulation method and error correction methods, to be configured via a "remote control" asynchronous EIA-232 I/O port. The ICE M&C port type and I/O driver software on the DSP Board match the external data bus types and data rates with which the DSP interfaces. The M&C I/O ports on the DSP Board are usually EIA-232 async ports, but the M&C I/O port could be a universal serial bus port, EIA-1394, parallel port, or other type of port, depending on the ICE M&C channels used. In ICE embodiments using an EFData 300L as the ICE Modem, the DSP Board includes a multi-port Universal Asynchronous Receiver Transmitter ("UART") and UART software driver to provide an ICE M&C channel between the DSP and the ICE Modem. (The local M&C control paths and UART are described in more detail in the discussion of FIG. 8 below.) The remote control port (201) on the EFData 300L modem is connected by an internal cable to a first port on the UART (204) on the DSP-based computer embedded on the DSP Board (such computer is called an "Embedded DSP"). This async connectivity enables the Embedded DSP to configure and control the EFData 300L modem. The Inmarsat-B MES normally used with the ICE invention is the Nera Saturn Bm ("Saturn B"), manufactured by Nera ASA, Kokstadveien 23, Bergen, Norway (www.nera.no). The Saturn B software is available with an API that enables external control of the Saturn B HPA via a standard EIA-232 or data terminal equipment ("DTE I/O") port on the MCU. A second port (205) on the UART in the Embedded DSP is connected to the Saturn B DTE I/O port (206) to provide an ICE M&C channel between the DSP Board and the MCU. ICE M&C messages exchanged between the MCU and the DSP Board include messages reporting the status and configuration of the Saturn B and messages to control the transmit power level of the Saturn B HPA. The Saturn B API may also enable external use of the MCU display and telephone keypad so that user input and display output can be sent through the Saturn B DTE I/O port to the DSP. L-band modems and Inmarsat-B MESs of other manufacturers can be used so long as such equipment provides the APIs, I/O ports, and control capabilities that are described above and required by the ICE invention. Such APIs are specific to a given manufacturer's equipment, and the commands and parameters provided by the Local ICE Management Program are tailored to support each such API. A third port (207) on the UART is used for diagnostic purposes by connecting a local PC or an async M&C channel to the ICE Server via an external network. A fourth port (208) on the UART can be used to connect to an ESC card that, if installed in the ICE modem, multiplexes in the traffic path an ICE M&C channel to the ICE Server. When an ESC card is not installed in the ICE Modem, the fourth port on the UART can be used for other ICE M&C purposes, such as handover coordination in a redundant configuration of Inmarsat-B ICE MES Retrofits described below. The DSP also sets some status LEDs on the user interface displays of the ICE Modem and/or MCU and sets control leads (209, 210) for the entry and exit switches on the DSP Board. If additional control of local async devices is desired, such as when an ESC ICE M&C path, a redundant configuration of Inmarsat-B ICE MES Retrofits, and a dedicated diagnostic port are required, a UART with additional ports (e.g., a 6 port UART) may be used.

As shown in FIG. 2, the multiplexed output of the MCU is connected to the entry connector (211) on the DSP Board. RF paths on the DSP Board in the Inmarsat-B ICE MES Retrofit are at L-band frequencies. Standard Services baseband equipment (telephone, fax, serial data paths) is connected to the baseband ports of the MCU. ICE Services bitstreams are connected to the baseband port ("Traffic DTE I/O") of the ICE Modem. During periods in which the MCU is on-line providing Standard Services ("ICE OFF mode"), the MCU transmit/receive channels, DC power to the RF terminal, and the standard M&C channel pass through two connectors (an entry connector (211) and an exit connector (217)), two switches (an entry switch (218) and an exit switch (219)) and a path (212) interconnecting the switches on the DSP Board. In ICE OFF modes, the active transmit components of the DSP Board are bypassed and the MCU traffic path interfaces directly with the RFT. The DSP Board comprises an embedded computer, two diplexers, two switches, support electronics such as splitters, amplifiers, couplers, and filters, and signal and control paths mounted on a circuit board. On the DSP Board, between the entry connector and the entry switch, the multiplexed transmission path from the MCU is tapped by a low pass filter (213) and the L-band signals continue through a directional coupler (214), but not through the low pass filter (213). The standard M&C channel and DC power, but not the L-band transmit and receive signals, pass through the low-pass filter (213), a second low pass filter (215), and connect to a combining point described below that is on or near the exit connector.

The Embedded DSP (220) executes a copy of the Local ICE Management Program that controls whether the ICE mode of operation can be activated. The Local ICE Management Program interfaces the DSP with the MCU, the ICE Modem, and certain components on the DSP Board. The output of the DSP Board is fed to the HPA in the RF terminal (216). The transmission path from the MCU and from the ICE Modem, through the DSP Board, to the RF terminal is two way (transmit and receive) except during ICE ON modes, when the standard modem transmit path is terminated in a dummy load (221). During ICE OFF modes, the ICE Modem has no transmit output. An Inmarsat-B ICE MES Retrofit can transmit and receive in either standard or ICE mode, but not both modes, at a given time.

Figure 3:
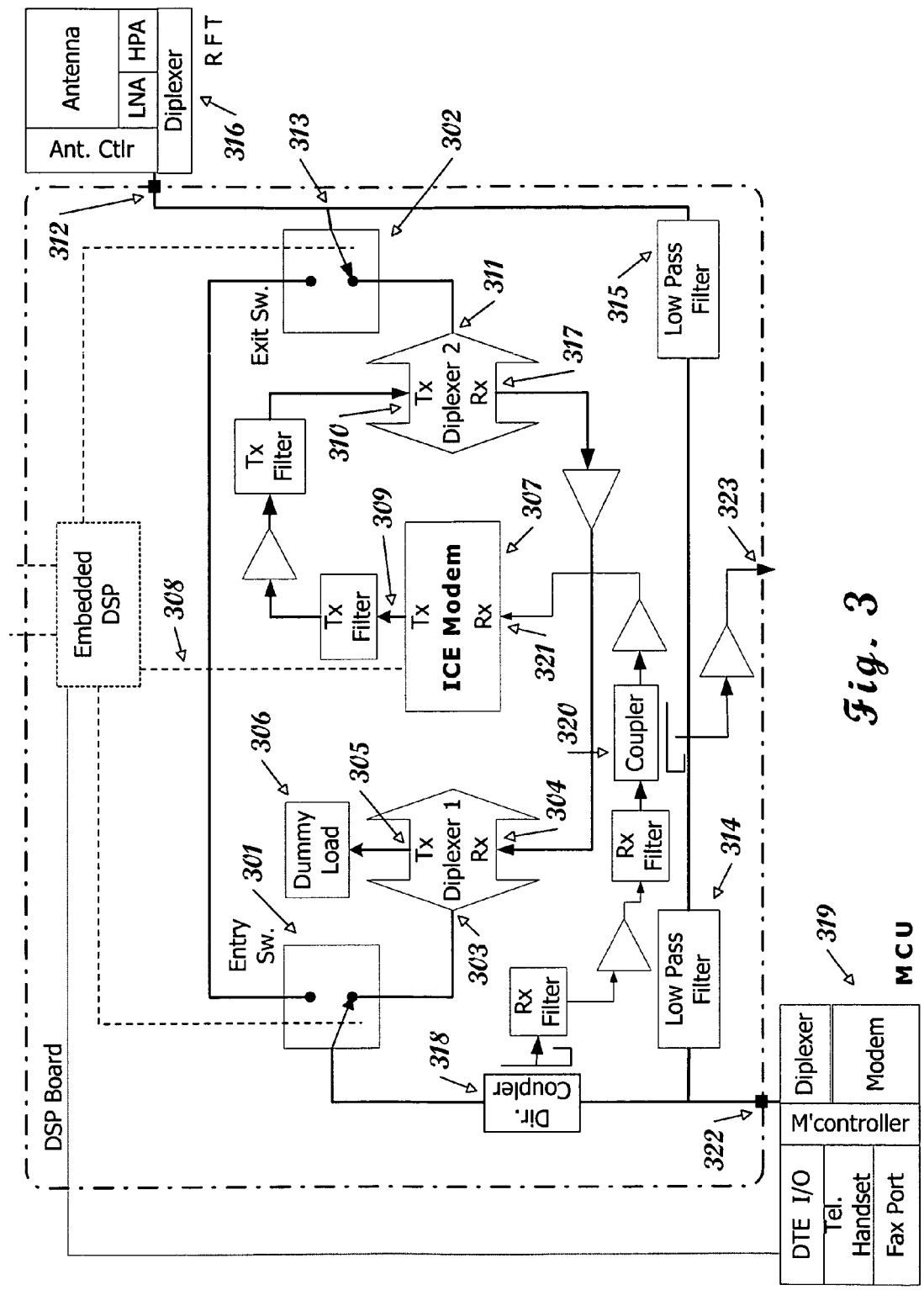
FIG. 3 illustrates the DSP Board in ICE ON mode.

As shown in FIG. 3, when ICE mode is activated ("ICE ON" mode), the entry (301) and exit (302) switches on the DSP Board are thrown to insert the ICE Modem and other active components on the DSP Board into the RF path to the RFT. In ICE ON mode, the entry switch (301) on the DSP Board connects the multiplexed output of the MCU to the diplexed port (303) of a first diplexer in the DSP Board. The first diplexer separates the receive and transmit paths and connects them to receive (304) and transmit (305) ports, respectively, of the first diplexer. At the transmit port of the first diplexer, the standard MCU transmit path is terminated in a dummy load (306). The diplexer/switch performs two primary functions. The first function is to accept the downlink signal from the ADE and provide the received L-band signal to the MCU and the ICE modem. The second function performed by the diplexer/switch is to select the desired uplink RF source, either the MCU or the ICE Modem, and feed it to the ADE. In ICE ON mode, the entry and exit switches on the DSP Board are thrown to insert the ICE Modem (307) (which has been activated by a command from the Local ICE Management Program over an ICE M&C control path (308)) and other active components on the DSP Board into the RF path to the RFT. In ICE ON mode, the ICE Modem transmit path (309) is connected to the transmit port (310) of a second diplexer. The diplexed port (311) of the second diplexer is connected through the exit switch (302) to the exit connector (312). Between the exit switch (302) and the exit connector (312) at a combining point (typically, a "T" connection on the exit connector side of the exit switch (313) or on the exit switch itself), the diplexed transmit and receive path from the diplexed port (311) of the second diplexer are combined with the standard M&C channel and DC power that pass through the first and second low pass filters (314, 315). The multiplexed path continues from the combining point through the exit connector on the DSP Board, via the RF cable, to the RFT (316). Because the standard M&C channel and DC power pass undisturbed through the DSP Board, the MCU can control the HPA and antenna during both ICE OFF and ICE ON modes.

During ICE ON mode, from the exit connector (312) on the DSP Board, the receive path follows the traffic path through the exit switch (302) to the diplexed port (311) of the second diplexer and appears at the receive port (317) of the second diplexer. The receive path is then amplified and feeds the receive port (304) of the first diplexer, which diplexes the receive channel into the traffic path that runs through the entry switch (301) and the directional coupler (318) to the MCU (319). The directional coupler (318) between the entry connector and the entry switch on the DSP Board provides a branch of the receive path from the antenna. From the directional coupler (318), the branch receive path is amplified, filtered, passes through a second coupler (320), is amplified again, and then feeds the receive port (321) of the ICE Modem. By feeding the receive port of the ICE Modem from a directional coupler (318) between the entry connector (322) and the entry switch (301) on the DSP Board, the receiver in the ICE Modem obtains a received signal independent of the position of the entry and exit switches. The tapped output of the second coupler (320) in the branch receive path is amplified and provided to an L-band receive monitor connector (323) on the DSP Board.

During ICE ON mode in an Inmarsat-B ICE MES Retrofit that uses current models of a Saturn B as the standard MES, the transmit amplifiers on the DSP Board are driven into compression to remove some effects of the drive level control circuitry in the Saturn B HPA that would otherwise cause the HPA to be switched off. Specifically, this compression helps to remove amplitude variations introduced by the built-in filtering of the ICE Modem and to produce a "constant envelope" signal that is acceptable to the drive level control circuitry of the HPA. The output of the HPA during ICE ON mode still complies with Inmarsat-B RF specifications, including those for spectral purity.

An L-band receiver, spectrum analyzer, or other equipment can be connected to the L-band receive monitor connector (323). By inserting in the branch receive path connecting the directional coupler (318) with the receive port (321) of the ICE Modem additional filter(s), amplifier(s), splitter(s), and/or couplers (including directional coupler(s)) in a manner known in the art, additional isolated L-band receive ports can easily be created. Such additional L-band receive monitor ports can be used to receive broadcast and other one-way ICE Services. Maintaining receive path continuity from the RFT, through the exit switch, through the second diplexer, through the first diplexer (after amplification), through the entry switch, through the directional coupler to the MCU, and finally to the receiver in the MCU enables the MCU to monitor the CESAL carrier during ICE ON mode. The diplexer/switch is therefore transparent to the downlink path and L-band receivers associated with the downlink, e.g., both the MCU and the ICE Modem receive the downlink path regardless or which system is selected for uplink transmission. This permits both the MCU to remain locked on the CESAL carrier and the ICE Modem to remain locked to the ICE Services forward carrier (from the LES) at all times, which allows the MCU to continuously track and peak the antenna on the desired satellite. The traffic path through the DSP Board during ICE ON mode is called the "ICE Path". The traffic path through the DSP Board during ICE OFF mode is called the "Bypass Path".

Figure 4:
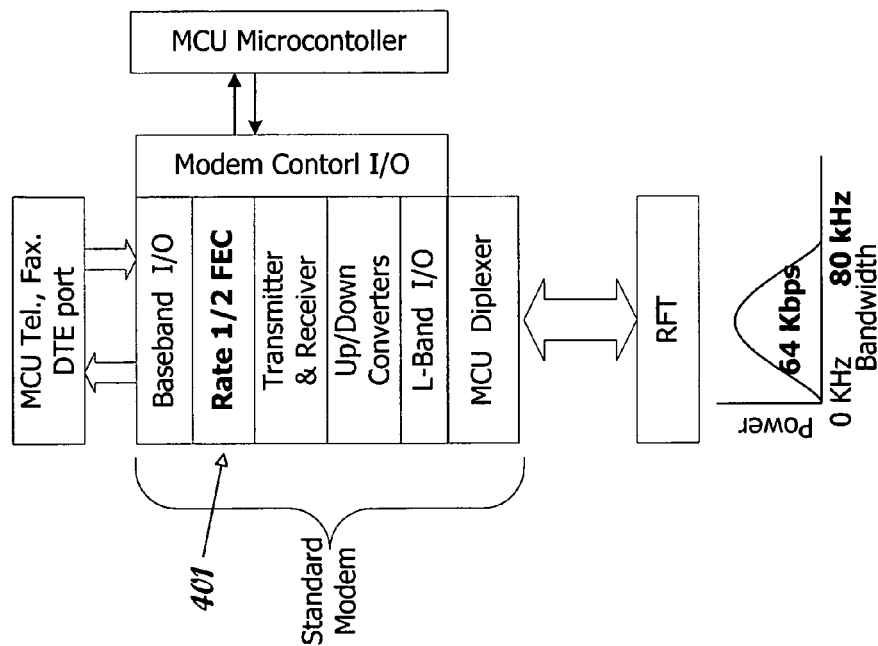
FIG. 4 illustrates the MCU to RFT traffic path in a standard MES.

As shown in FIG. 4, a standard modem in Inmarsat HSD service on an Inmarsat-B MES uses a rate 1/2 FEC (401) and OQPSK to obtain 64 kbps in a 100 kHz slot (64 kbps data rate×1/2 (OQPSK)×2 (FEC)=64 Ksps; occupied bandwidth=1.25×64 Ksps symbol rate=80 kHz).

Figure 5:
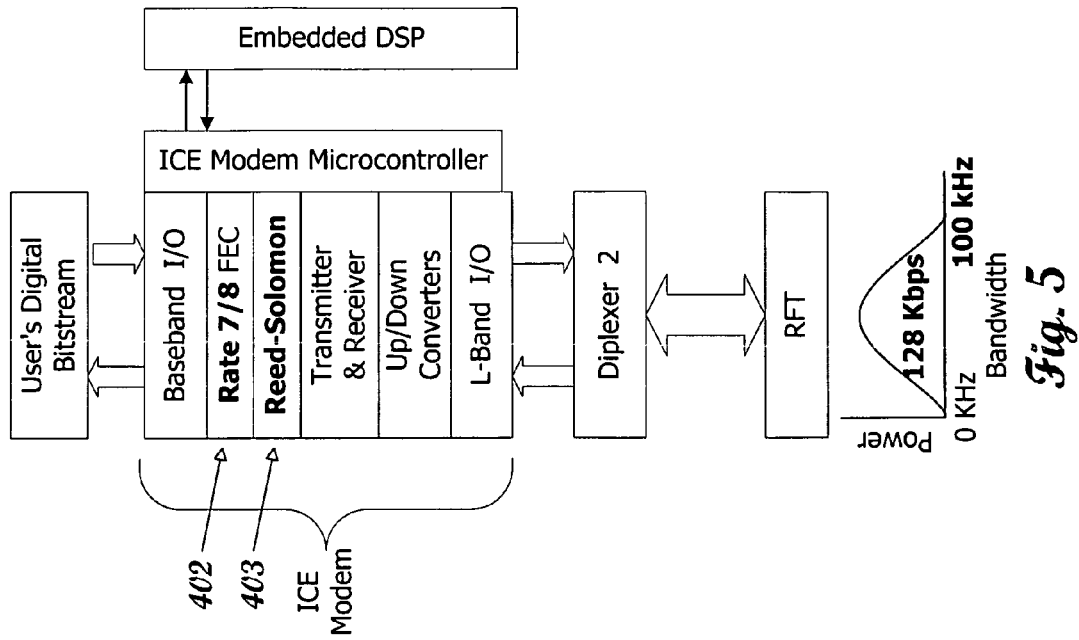
FIG. 5 illustrates the illustrates the ICE Modem to RFT traffic path in an Inmarsat-B ICE MES Retrofit.

As shown in FIG. 5, in the Inmarsat-B ICE MES Retrofit, the ICE Modem can use rate 7/8 FEC (402), OQPSK, and Reed-Solomon error correction (403) to obtain 128 kbps in a 100 kHz slot (128 kbps data rate×1/2 (OQPSK)×8/7 (FEC)×1.1 (Reed-Solomon)=80 Ksps; occupied bandwidth=1.25×80 Ksps symbol rate=100 kHz). Although the ICE carrier is 20 kHz wider than the standard carrier in this example, the ICE carrier fits within the leased slot. Inmarsat leases slots in 25 kHz increments, so the higher throughput of ICE scales linearly with the bandwidth of a given slot. In a 25 kHz slot for Inmarsat-B use, ICE mode provides a 32 kbps data rate. A standard Inmarsat-B MES cannot operate in lease mode at data rates other than 64 kbps and bandwidth allocations other than 100 kHz. The Inmarsat-B ICE MES Retrofit uses a combination of forward error correction methods carefully designed to double data throughput without exceeding leased bandwidth or causing an MES error condition. In the Inmarsat-B ICE MES Retrofit, Reed-Solomon error correction is performed before rate 7/8 FEC coding in the modulation (transmit) path, and after rate 7/8 FEC decoding in the demodulation (receive) path. Other types of error correction (such as those more efficient than Virterbi and sequential error correction) can be implemented as they become available in a programmable modem used as the ICE Modem. For instance, upon the availability of rate 3/4 "Turbo FEC" in the EF Data 300L, rate 7/8 FEC concatenated with Reed-Solomon can be replaced by rate 3/4 Turbo FEC. One such "Turbo FEC" being implemented on programmable modems is published as "Turbo Product Coding" by Efficient Channel Coding, Inc., 600 Safeguard Plaza, Suite 100, Brooklyn Heights, Ohio 44131 (www.eccincorp.com). Such replacement can be used to increase fade margin and decrease delay without decreasing data rate. Inmarsat-B MCUs and HPAs, including those in the Saturn B are designed to meet and continuously monitor the strict MES performance specifications mandated by Inmarsat. If the HPA used with the Saturn B amplifies a waveform that lacks a constant envelope, the Saturn B management software interprets the HPA state to be abnormal, reports an error condition, and turns off the HPA. Therefore, the input signal to the HPA from the ICE Modem and from the standard modem have a constant envelope waveform. Because the ICE signal bandwidth and power requirements are different for different data rates, during ICE ON mode, the Local ICE Management Program uses M&C messages to the MCU to adjust HPA power level to meet the requirements for the configured data rate.

FIG. 6 shows a state table that specifies under what MES conditions the Local ICE Management Program can acquire use of the ADE for ICE mode operations. The Local ICE Management Program controls the diplexer/switch and ICE Modem directly and the HPA through messages to the MCU. The Local ICE Management Program polls the MCU frequently to learn MES status. To ensure compliance with Inmarsat specifications, if the MCU detects an error condition in the MES (including the HPA), the MCU changes MES status messages from "OK" to an error message. ICE ON mode can be invoked manually or according to configuration parameters (i.e., start and stop times) stored in NVRAM in the Embedded DSP. The Local ICE Management Program also prevents an Inmarsat-B ICE MES Retrofit from entering or remaining in ICE ON mode unless the Inmarsat-B ICE MES Retrofit is currently receiving forward carrier (i.e., RF carrier from a LES to a given Inmarsat-B ICE MES Retrofit).

FIG. 7 shows the message exchange managed by the Local ICE Management Program to enter ICE ON upon the occurrence of a start time in a configuration stored in NVRAM. The Local ICE Management Program can only acquire use of the ADE for ICE mode operations (and adjust the HPA power level during ICE ON mode) when MES status is "OK" and the standard modem is idle (not busy with a call). At any time, if the Local ICE Management Program detects an MES status of "error" or "standard modem busy," the Local ICE Management Program prevents entry into ICE ON mode. During ICE ON mode, if the Local ICE Management Program detects an MES status of "error" or "emergency call", or the date and time are not within the authorized start time and stop time for ICE Services, or a user configures the MCU for an ocean region that the Inmarsat-B ICE MES Retrofit does not have a configuration for, or a user terminates ICE ON mode by entering an "ICE OFF" command through the user interface (e.g., to send a standard dial-up call, including a distress call via X.25 or telex), or a diplexer or other ICE Path component fails, then the Local ICE Management Program switches the traffic path from the ICE Path to the Bypass Path, thereby reconnecting the MCU directly through the Bypass Path to the RFT.

Figure 8:
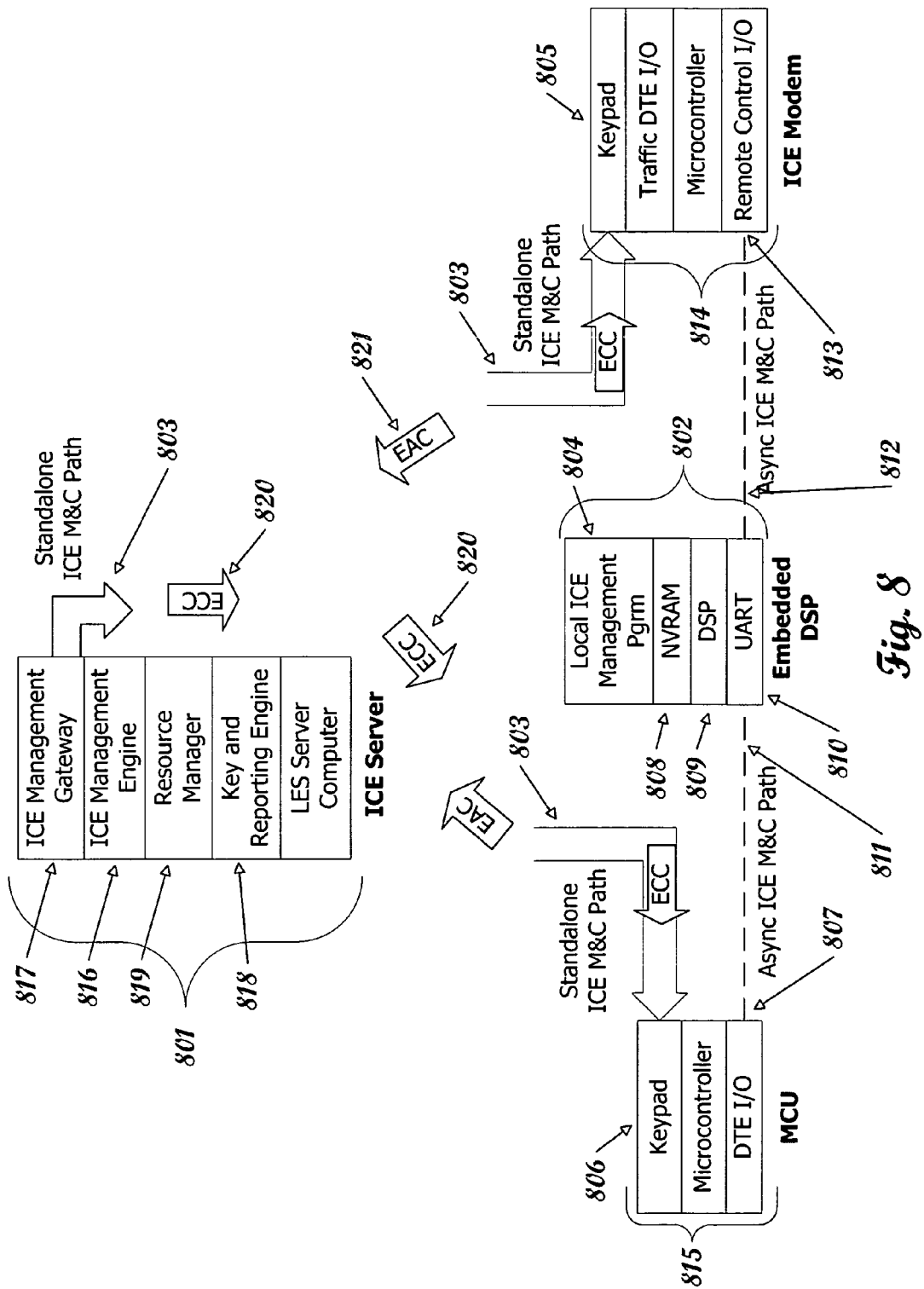
FIG. 8 illustrates the exchange of ECCs and EACs in the ICE Management System architecture.

As shown in FIG. 8, the ICE Management System comprises at least one ICE Server (801) associated with each LES providing ICE Services, ICE Server application software, at least one Embedded DSP (802), non-real-time control paths (803) between the ICE Server and each Embedded DSP, a Local ICE Management Program (804) running on each Embedded DSP (802), and async control paths between each Embedded DSP and the components that an Embedded DSP controls in an Inmarsat-B ICE MES Retrofit. ICE management software running on an Embedded DSP is specific for a given ICE embodiment, e.g., the Local ICE Management Program for retrofitting a Saturn B MES uses APIs specific to a Saturn B. The Local ICE Management Program for a different brand and model of MES would be specific to the APIs of such different brand and model. An ICE Server is associated through real-time network communications with one or more LESs providing satellite communications services to Inmarsat-B ICE MES Retrofits. The ICE Server for a LES is normally located at the LES. The ICE Server manages resources for ICE Services with functionality analogous to that provided by an NCS and ACSE for Standard Services, plus additional functionality explained below that is specific to ICE Services.

To control a given ICE embodiment, the ICE Server addresses ICE M&C messages to a given ICE Modem (each of which has a unique address) and uses an ICE M&C channel to send the ICE M&C message to the Embedded DSP that controls the uniquely addressed modem. In the Inmarsat-B ICE MES Retrofit, upon receipt by a human end user of an ICE M&C message delivered by a standalone ICE M&C channel, the human end user enters the set of numbers comprising the standalone ICE M&C message on the keypad (805) of the ICE Modem (814) or of the MCU telephone handset (806). A standalone ICE M&C message may optionally be entered using a front panel keypad, pushbutton(s), or other input device on the MCU, so long as such input devices are made available by an MCU API through the MCU DTE I/O port (807). As explained in more detail below, the Embedded DSP decrypts the ICE M&C message and stores the decrypted configuration information in NVRAM (808) associated with the Embedded DSP. Before storing a configuration, the Embedded DSP confirms the target of the configuration is an ICE Modem under the control of the Embedded DSP. Configurations in a decrypted ICE M&C message are implemented by the Embedded DSP based on the current ocean region configuration of the Saturn B terminal and the current date and time specified in a delivered configuration. For ICE Services, the ICE Server manages the power and bandwidth as a pool through methods that are appropriate for the ICE implementation, e.g., four ICE Services carriers in a given 100 kHz of bandwidth, or a single ICE Services carrier using 200 kHz of bandwidth.

The Embedded DSP contains a DSP (809), a UART (810) with four or more asynchronous ports, NVRAM (808) or other nonvolatile memory, RAM, a memory bus, a system bus, and support circuits, all as known in the art of embedded processors. All ICE control paths between the DSP and components on the DSP Board, the MCU, the ICE Modem, and a real-time ICE M&C channel (if any) flow through the UART. The UART, entry and exit switches on the DSP Board, and the ICE Modem (814) are under direct and full-time control by the DSP. Through the UART (810) and an async ICE M&C control path (811) from the UART to the MCU DTE I/O port (807) on the MCU (815), the DSP uses the API of the MCU management program to control the HPA during ICE ON mode, to receive data from the MCU keypad, and to display data on the MCU telephone handset display, or other MCU display. Through the UART (810) and an async ICE M&C control path (812) from the UART (810) to the ICE Modem remote control I/O port (813), the DSP uses the API of the ICE Modem management program to control the ICE Modem during ICE ON mode, to receive data from the ICE Modem keypad (805), and to display data on the ICE Modem display (if any). As described below, additional ports on the UART (810) can be used to provide an M&C channel for diagnostic services, and to control optional external equipment.

The Local ICE Management Program running on the Embedded DSP monitors, among other variables, status of the ICE Modem (814), status of the MCU (815), local user inputs via the keypad (805) of the ICE Modem and via other M&C channels interfaced with the Embedded DSP through the UART. This status information for the various components of the Inmarsat-B ICE MES Retrofit is processed by the Embedded DSP and reported to user displays and, optionally, to the diagnostic port or other M&C path(s) connected to the UART. A user can override ICE ON status from a user interface on a device connected to the UART (810), e.g., MCU keypad, ICE Modem keypad, or diagnostic PC.

The ICE Server application software comprises three principal components, an ICE Management Engine (816), an ICE Management Gateway (817), and a Key and Reporting Engine (818). The ICE Server application software manages and controls the critical parameters of Inmarsat-B ICE MES Retrofits (and other ICE embodiments described below) through the use of an ICE M&C message type called an "encrypted configuration code" ("ECC"). Inmarsat-B ICE MES Retrofits and other ICE embodiments described below are hereafter collectively referred to as "ICE-enabled Terminals". Each ECC (820) is addressed using an identification number unique to a given ICE-enabled Terminal. Only an ICE Management Engine (816) can generate ECCs. The ICE Management Engine generates and encrypts each ECC using an encryption algorithm, a seed key, and a Pseudo-Random Number ("PN") code generator. The encryption algorithm, seed key and PN code generator method is known in the art, e.g., public key/private key infrastructure uses a similar method of an encryption algorithm, a seed key, and PN code generator. When the input to the encryption process is integers, the encrypted output can be integers formatted to meet the requirements of various ICE M&C channels (as an example, for a standalone ICE M&C channel using the front panel keypad of the EFData 300L modem for entry of an ECC, numbers must use a "5.3" or "xxxxx.yyy" "dotted decimal" format.). A given ICE Server and all ICE embodiments controlled by the ICE Server use the same PN code generator method and rules. The PN code generator at a given ICE Server may be reconfigured from time to time via an encrypted message delivered through ICE M&C channels to ensure security of the ICE M&C channels. In FIG. 8, the ECCs (820) generated by the ICE Management Engine (816) are forwarded to the ICE Management Gateway (817) for delivery by stand-alone ICE M&C channels (803) to the specific ICE-enabled Terminal addressed in the ECC. In a stand-alone ICE M&C channel, the operator of the ICE-enabled Terminal in FIG. 8 enters an ECC through either the keypad (805) on the ICE Modem or the keypad (806) on the MCU handset. The Embedded DSP in the ICE-enabled Terminal collects the entered ECC through a local ICE M&C channel (normally carried on a local async M&C path (811) between the Embedded DSP and the MCU, or the local async M&C path (812) between the Embedded DSP and the ICE Modem, depending upon which keypad was used to enter the ECC).

Configuration of critical parameters for a given ICE Modem is possible only by inputting ECCs at the ICE-enabled Terminal containing that ICE Modem. The control paths between an ICE Server and an Embedded DSP always include non-real-time, or standalone, control paths. A non-real-time control path includes the use of telex, telegram, email or fax, as well as non-electronic messaging, such as a letter or oral message (each, a "standalone ICE M&C channel"). Optionally, real-time control paths may be used, such as an ESC between the ICE Server and an Embedded DSP, or external network connectivity between the ICE Server and an Embedded DSP (each, a "real-time ICE M&C channel"). An ESC normally uses the same transmission path as used by the payload or traffic messages exchanged between two nodes in a communications network. Real-time, interactive M&C channels are known in the art, but a non-real-time M&C channel that deprives end users of the ability to directly configure telecommunications and information technology equipment is rare or unknown. The same content and format of ICE M&C messages are communicated, regardless of whether the ICE M&C channel between the ICE Server and the Embedded DSP is a real-time ICE M&C channel or a standalone ICE M&C channel. ECCs do not contain commands, only configurations, although some configurations can essentially be commands, For instance, the ICE OFF state can be forced by sending an ECC with appropriate start/stop times. In contrast, when an ICE-enabled Terminal is in an ICE OFF state, local user involvement is required to enter ICE ON mode, even if an ICE ON configuration with a valid start time has been previously received and stored in NVRAM (808). An Inmarsat-B ICE MES Retrofit will not enter ICE ON mode unless the correct CESAL carrier is being received and a local user selects ICE ON using a local user interface.

The Embedded DSP uses an ICE M&C channel on the async ICE M&C path (811) to the MCU periodically to query the MCU to determine the ocean region setting using the message exchange shown in FIG. 7. Based on the current ocean region reported by the MCU, the Embedded DSP will select the appropriate valid configuration stored in NVRAM (808) for implementation. An MCU response of "error", "busy", "no carrier" causes the Embedded DSP to remain in ICE OFF mode. If the MCU status reply is "OK", the Embedded DSP commands the MCU to turn on the HPA at a power level specified in the command, and to set a power level alarm threshold. If the power level alarm threshold is reached, the MCU turns off the HPA. If the MCU turns on the HPA in response to the command from the Embedded DSP, the Embedded DSP turns on the ICE Modem. In an Inmarsat-B ICE MES Retrofit, the Embedded DSP also throws the entry and exit switches on the DSP Board to connect the ICE Modem to the ADE. Also stored in NVRAM are power level vs data rate settings applicable to a given HPA; these settings are used by the Local ICE Management Program to control the power level of the HPA based on the ICE Services data rate. Multiple configuration tables for multiple ocean regions may be stored in NVRAM.

To resolve interference problems, or for other control or safety measure, LES operators may drop the forward carrier to an Inmarsat-B ICE MES Retrofit for a selectable number of minutes ("time out period") to invalidate a current operating configuration of any Inmarsat-B ICE MES Retrofit listening to that specific forward carrier. On loss of forward carrier, the Embedded DSP starts a timer and polls the MCU with queries to confirm that the MCU is responding and not reporting loss of CESAL carrier. If the MCU responds "OK" continuously without indicating a loss of CESAL carrier for time out period, the Embedded DSP will cause the Inmarsat ICE MES Retrofit to enter a "suspended" operation mode until new ECCs (820) are received from the ICE Server (801)

All ICE M&C messages processed by an Embedded DSP reach the Embedded DSP through the UART on the DSP Board. All ICE M&C messages use the same format when unencrypted, regardless of which UART port (MCU, ICE Modem, diagnostic, real-time M&C channel (if any), redundant configuration (if any)) a given ICE M&C message transits. Because critical configuration parameters are always encrypted as ECCs, critical configuration parameters that if incorrectly or maliciously entered would cause interference into other Inmarsat users can be delivered as ICE M&C messages using a standalone ICE M&C channel. Messages other than ECCs, including unencrypted messages where appropriate, use the ICE M&C channels. The forward carrier to an ICE-enabled Terminal required to implement a configuration in an ECC is not provided, however, unless an encrypted acknowledgement ("EAC") (821) is received by the ICE Server, as explained below.

Figure 9:
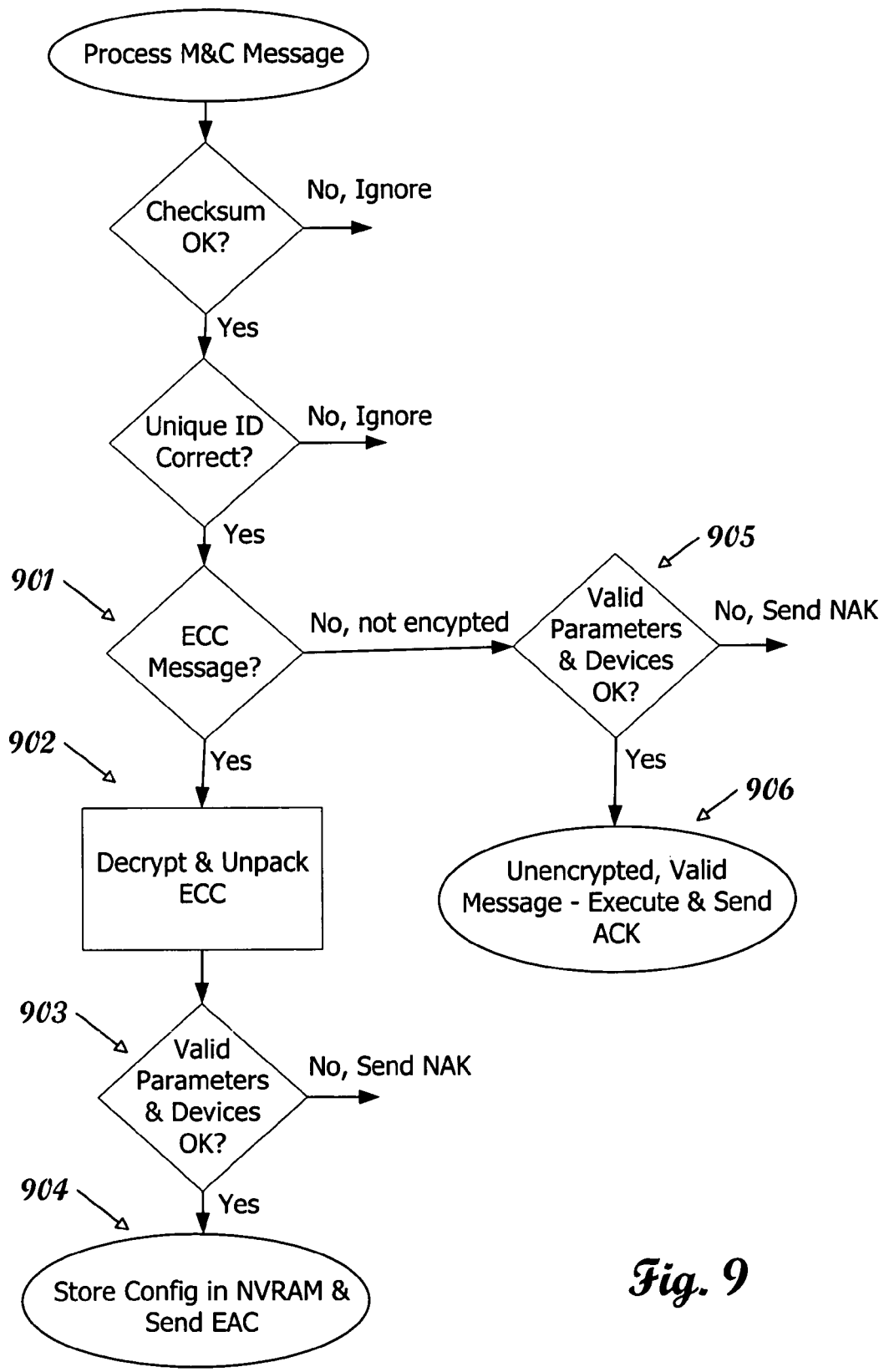
FIG. 9 is a flowchart of the processing of ECCs by an Embedded DSP.

As shown in FIG. 9, upon receipt (901) of an ECC by an Embedded DSP, the DSP decrypts (902) the ECC, if validated (903), and stores (904) the decrypted result in NVRAM associated with the DSP. An ECC contains parameters known in the art as necessary to configure a remote terminal (including mobile earth stations) for operation in a satellite communications network. Typical parameters are: ocean region (for Inmarsat-B ICE MES Retrofits and other ICE-enabled Terminals used in Inmarsat systems), a unique identifier for each ICE Modem (or for each ICE-enabled Terminal if an ICE embodiment does not use a modem), operation start time and date, data rate, operation end time and date, HPA power level (for Inmarsat-B ICE MES Retrofits and other ICE-enabled Terminals used in Inmarsat systems), time adjustments, transmit frequencies, and receive frequencies. Times and dates are normally in Universal Time Coordinated format. The start and stop date and time in an ECC has a resolution of a few minutes. On valid entry of a new configuration in at given ICE-enabled Terminal, the newly entered configuration overrides any start/stop time settings previously stored in NVRAM for the same ocean region and start/stop times. If the current time at the location of an ICE-enabled Terminal is outside of these start and stop limits, or an ECC is invalid, the Embedded DSP causes the ICE-enabled Terminal to remain in ICE OFF mode. An ECC is only valid operationally if confirmed by an encrypted acknowledgement code" ("EAC") sent to the relevant ICE Management Gateway by the ICE-enabled Terminal for which an ECC was created and within a defined period of time ("time-out parameter").

An EAC is generated (904) by the Local ICE Management Program running on the Embedded DSP in an ICE-enabled Terminal after an ECC is received, decrypted, unpacked (parsed into the correct configuration data fields), and validated. An EAC must be communicated to the ICE Management Gateway that sent the ECC before expiration of the time-out parameter. If a valid EAC is not timely received by the ICE Management Gateway, the ICE Management Engine will not release the relevant resources for the configuration contained in the unacknowledged ECC. The time-out parameter is set to match the response time of the ICE M&C channel used to deliver a given ECC, e.g., a mailed ECC would have a time-out parameter of days; an ECC sent over a real-time, interactive M&C channel could have a time-out parameter of minutes. If an EAC is not timely received, the ICE Server will cause the forward carrier for the relevant ICE-enabled Terminal to drop, thereby causing the Local ICE Management Program at the relevant ICE-enabled Terminal to switch to ICE OFF mode. The Local ICE Management Program will remain suspended in ICE OFF mode until a new configuration is delivered by an ECC. These procedures ensure that a frequency allocation is not wasted on an ICE-enabled Terminal that will not be timely configured to use the transmit and receive frequencies allocated in the relevant ECC.

ICE M&C messages sent from an ICE Management Gateway to an ICE-enabled Terminal can contain messages other than ECCs. As shown in FIG. 9, if an ICE M&C message received by an ICE-enabled Terminal is not an ECC, the message is tested (905) to see if it is a valid unencrypted message addressed to the ICE-enabled Terminal. If the non-ECC message is validated, the ICE-enabled Terminal sends (906) an acknowledgement ("ACK") message to the relevant ICE Management Gateway. If validation of a message other than an ECC fails, a negative acknowledgement ("NAK") is sent to the relevant ICE Management Gateway.

Figure 10:
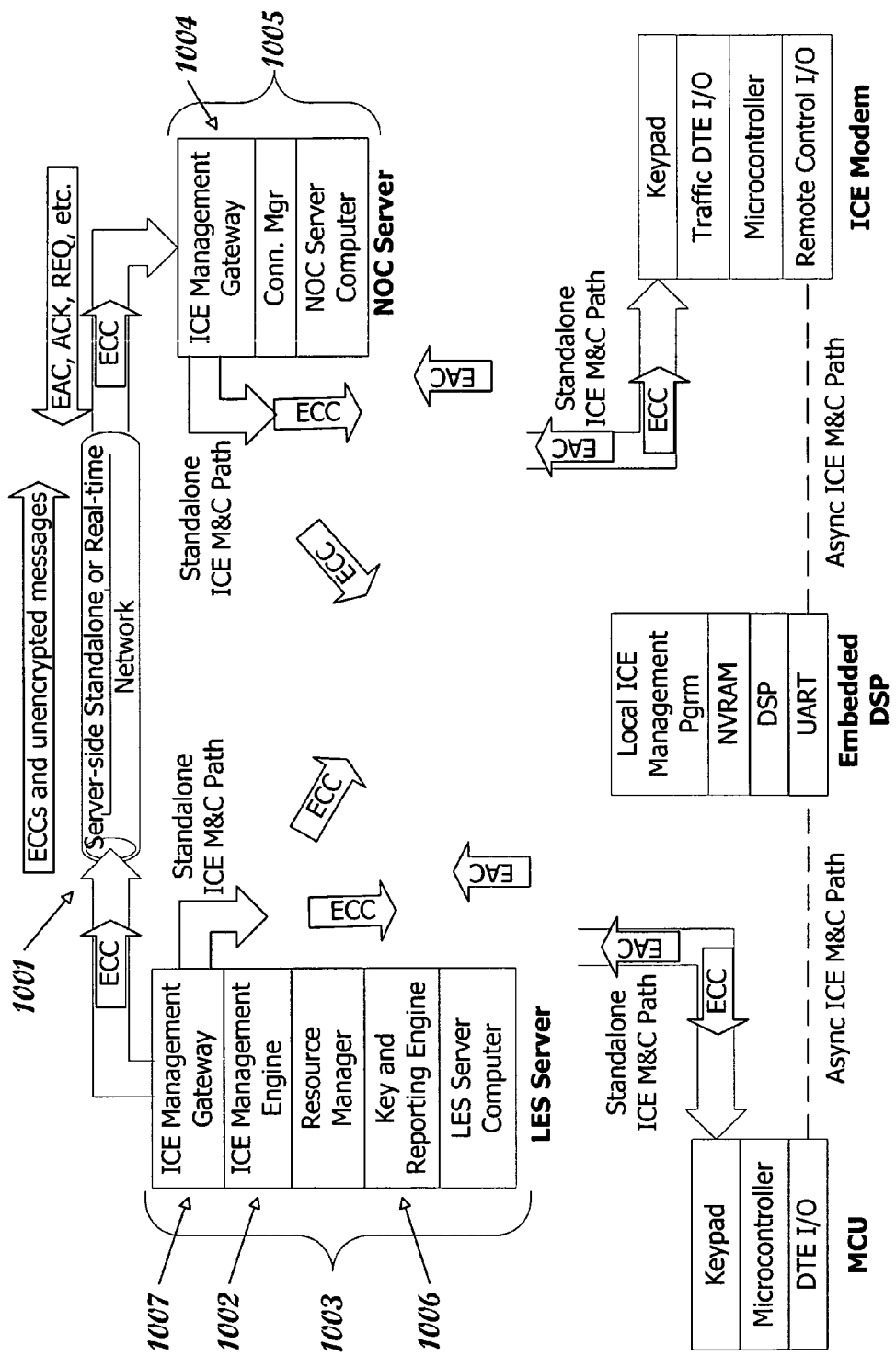
FIG. 10 illustrates a distributed LES Server and NOC Server in the ICE Management System Architecture.

As shown in FIG. 10, the ICE Server application software can be (and normally is) distributed over networked server computers and connected through server-side stand-alone or real-time ICE M&C channels (1001). When the ICE Server application software uses a distributed architecture, such as the architecture shown in FIG. 10, the server computer associated with a LES and that hosts the ICE Management Engine (1002) is called a "LES Server" (1003), and the server computer that hosts a copy of the ICE Management Gateway software (1004) at a NOC is called a "NOC Server" (1005). A NOC Server (1005) is associated only with the network operations of a given user of ICE Services. A customer of ICE Services provided by a LESO that operates a NOC Server is called a "NOC Operator". A NOC Server runs a copy of the ICE Management Gateway software (1004) that is activated by a software key issued by the Key and Reporting Engine (1006) running on a LES Server. A plurality of NOC Servers may be implemented and associated via a server-side network (1001) with a given LES Server. An ICE Management Gateway (1007, 1004), whether it runs on a LES Server or on a NOC Server, is a software application that uses ICE M&C channels to interact with one or more LES Servers, ICE-enabled Terminals, and other ICE Management System components described below. When an ICE Management Gateway (1002) runs on a NOC Server (1005), the NOC Operator manages the delivery of ICE M&C messages to ICE-enabled Terminals through an ICE M&C channel (standalone and/or interactive).

Figure 11:
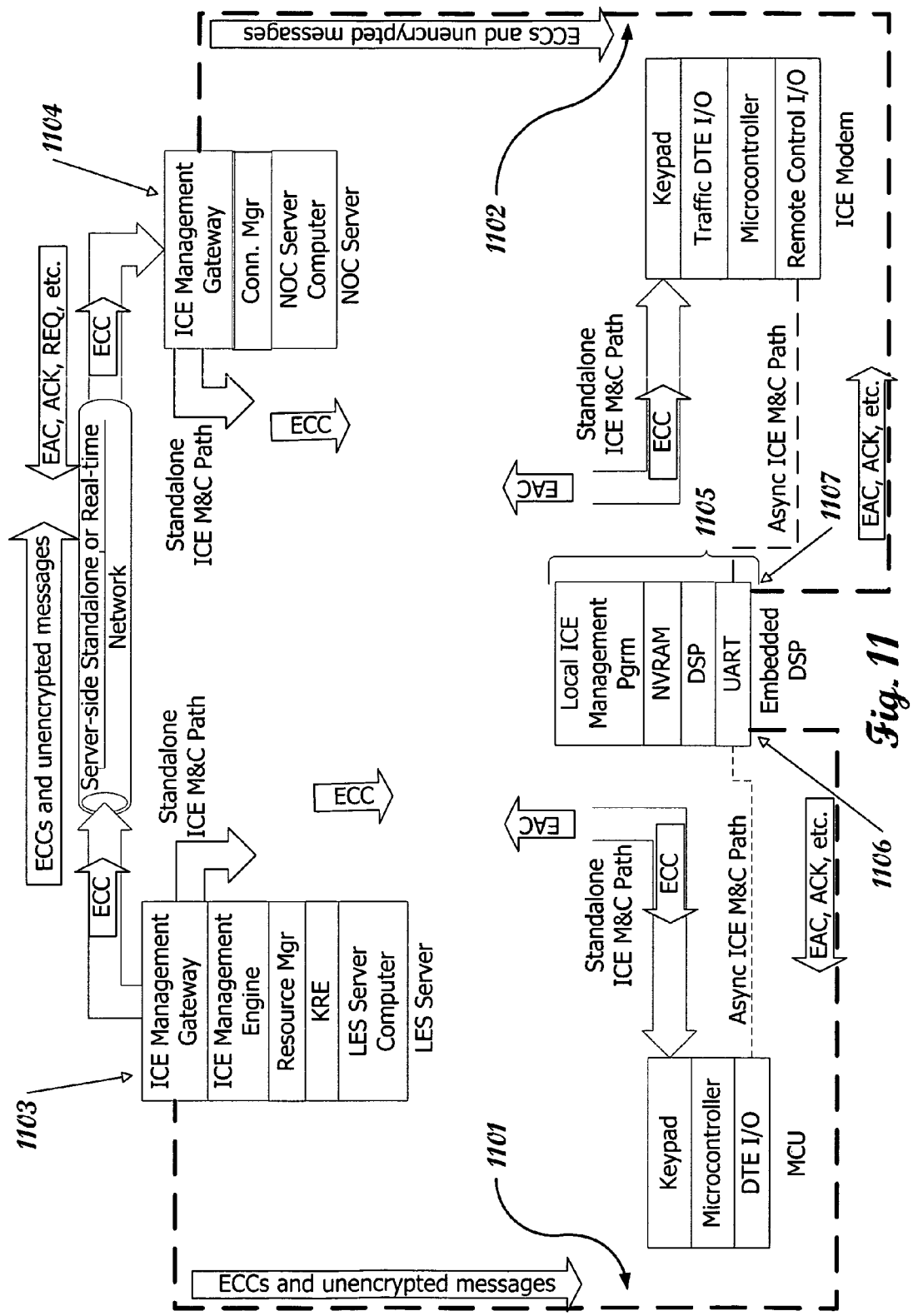
FIG. 11 illustrates use of an optional real-time ICE M&C channel in the ICE Management System Architecture.

As shown in FIG. 11, optional real-time, interactive ICE M&C channels (1101, 1102) may be implemented between an ICE Management Gateway (1103, 1104) and an ICE-enabled Terminal (1105). Such real-time, interactive ICE M&C channels can use an ESC (carried in the traffic path and processed by an ESC card in the ICE Modem) path or use a non-traffic path, such as a dial-up or dedicated packet data path. If a user elects not to operate a NOC Server, then LES personnel use an ICE Management Engine and ICE Management Gateway (1103) on the LES Server to provide such user with all ICE M&C services needed by such user When a real-time ICE M&C channel is used, real-time ICE M&C messages are exchanged between the DSP and the ICE Server through a port on the UART (1106, 1107). Processing by the Embedded DSP (1105) of real-time ICE M&C messages is the same as for standalone ICE M&C messages, except that real-time ICE M&C messages are delivered to the UART port for the real-time ICE M&C channel rather than to the UART port for the ICE Modem or MCU. Use of a real-time ICE M&C channel permits real-time power level adjustments based on signal strength reports received through the real-time ICE M&C channel. Each Embedded DSP with a real-time ICE M&C channel can report received signal strength to the ICE Server application software. The ICE Server application software issues power level adjustment messages through the real-time ICE M&C channel to Embedded DSPs. The power level adjustment messages are encrypted using encryption methods described above.

Figure 12:
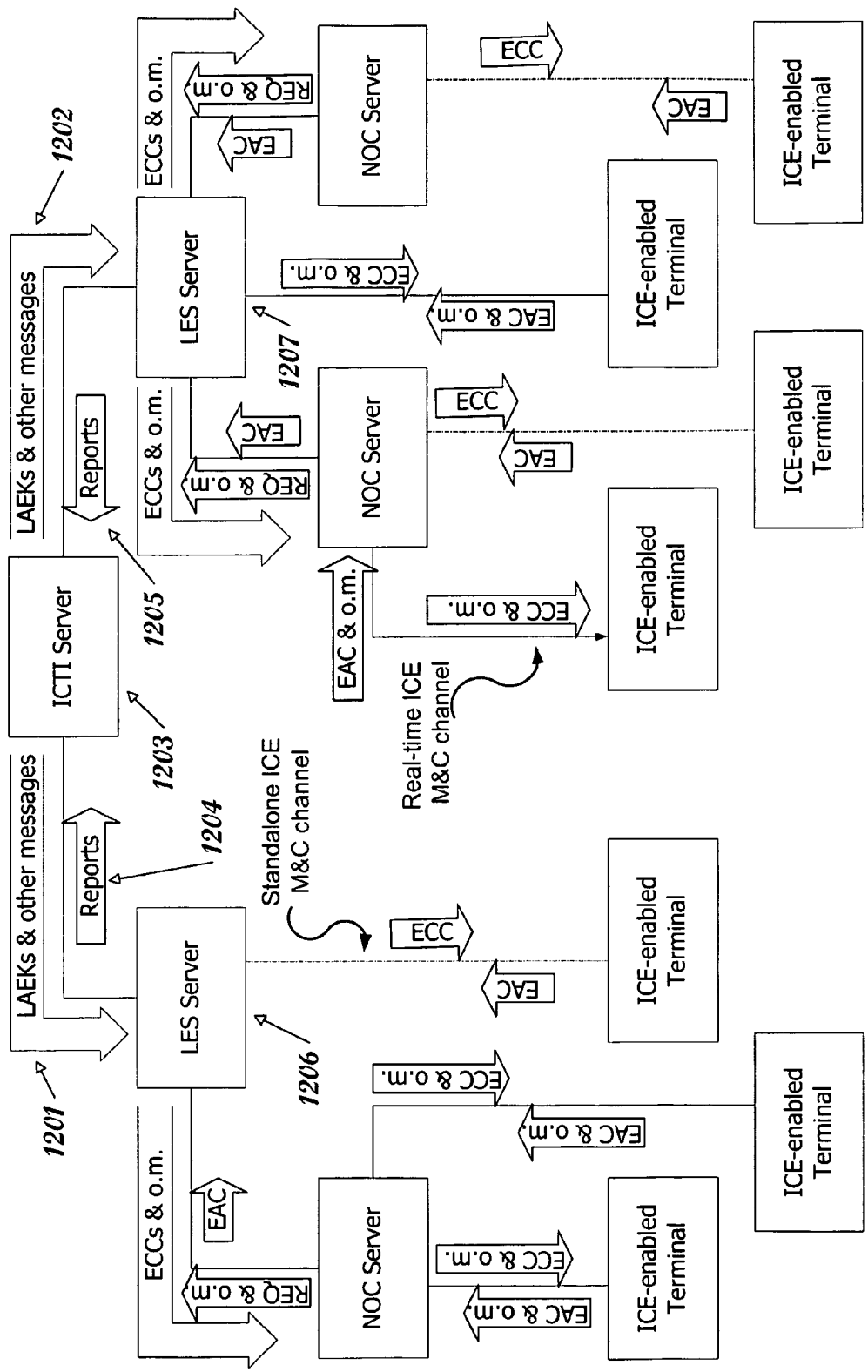
FIG. 12 illustrates the use of LAEKs and an ICTI Server.

As shown in FIG. 12, the provision of ICE Services by a given LESO is enabled a by an LES Account Enable Key ("LAEK") (1201, 1202) issued to such LESO by the master licensor of the ICE invention ("Master Licensor") using an "ICTI Server" (1203). LAEKs are created on the ICTI Server via the same PN encryption method used to generate ECCs and optionally by other key encryption methods known in the art. Upon receipt of a LAEK, a copy of the ICE Server software application is loaded on a server computer and the Key and Reporting Engine ("KRE") in that ICE Server (or LES Server) uses the LAEK to activate the other components of the ICE Server software application in a manner known in the art of software authorization keys. Once activated, the ICE Server (or LES Server) can provide ICE Services for the duration of the contract term (typically a few weeks) between the Master Licensor and a given LESO, subject to deactivation for contract default. A new LAEK is issued and installed on the relevant ICE Server (or LES Server) for each contract extension. Initial and renewal LAEKs can be delivered over a real-time or a stand-alone ICE M&C channel. Since an ICE Server and a LES Server are distinguished solely by whether a NOC Server has been implemented, the terms "ICE Server" and "LES Server" will hereafter be collectively referred to as "LES Server".

The Key and Reporting Engine associated with a given LES also maintains (i) customer accounts in which resources may be reserved for use by a given customer and internally by a LESO, and (ii) logs of actual usage of resources by a given customer and by the LESO. The reservation and usage records distinguish between resources dedicated to a given customer, resources dedicated to a group of customers ("pooled resources"), and undedicated resources retained by the LESO for ad hoc allocation. The Key and Reporting Engine associated with a given LES logs ICE Channel Unit usage and prepares summary reports (1204, 1205). ICE Channel Unit usage is typically defined as the maximum ICE Services data rate supported by a given ICE Channel Unit over a one-week period. The summary reports may be encrypted so that only the Master Licensor can access them. An ICTI Server, if used, retrieves these summary reports (and optionally, usage logs) from all LES Servers to which the ICTI Server has issued LAEKs, and uses the summary reports to generate invoices. LAEKs can be quickly invalidated by the ICTI Server if a LESO defaults on its contract with the Master Licensor. On payment of an invoice by a LESO, the ICTI Server generates LAEKs (1201, 1202) that are forwarded to the Key and Reporting Engine of the LES Server(s) (1206, 1207) at the relevant LES(s) to extend the operational period of such LES Server(s). The ICTI Server or the Master Licensor polls the Key and Reporting Engine on each LES Server periodically to obtain summary reports and usage logs. FIG. 12 also provides an overview of the flow of ECCs, EACs, and requests for ICE Services (generically denoted as "REQ"). FIG. 12 also illustrates that standalone ICE M&C channels principally carry ECCs and EACs, but real-time ICE M&C channels carry ECCs, EACs, and a variety of other messages.

Figure 13:
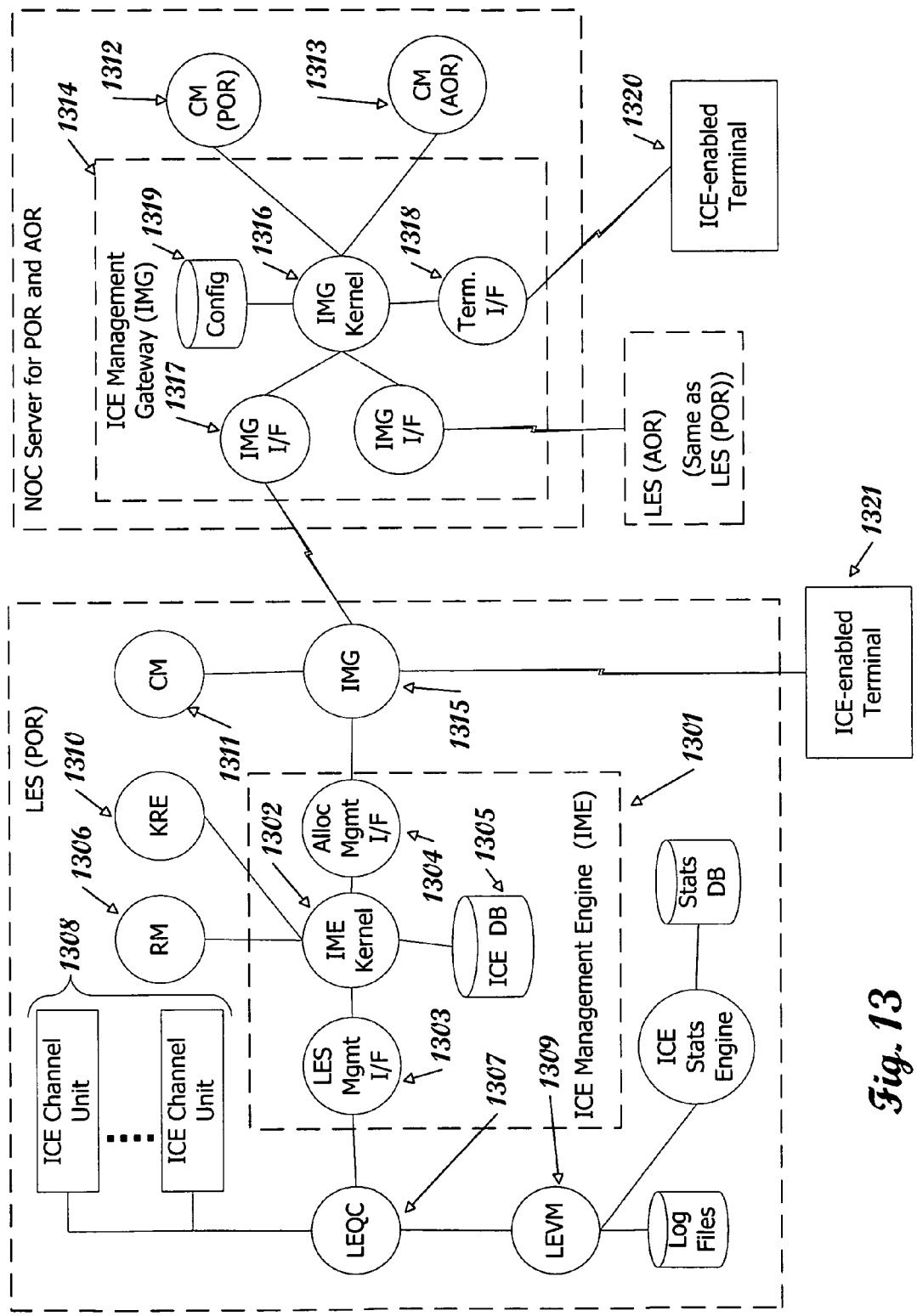
FIG. 13 illustrates the server-side software components of the ICE Management System.

As shown in FIG. 13, the ICE Management Engine ("IME") (1301) software application comprises the IME Kernel (1302), two interprocess interfaces (LES Management Interface (1303) and Allocation Management Interface (1304)), a centralized data repository ("ICE DB") (1305), and a LESO interface ("Resource Manager") (1306) to the IME. The IMB is the heart of the ICE Management System, and the IME Kernel is the heart of the IME. The IME (1301) reviews and disposes of (either by approval or rejection) allocation requests received from Connection Managers (described below), generates ECCs to implement approved REQs, validates EACs before releasing resources, and interacts with LESO personnel through the Resource Manager (1306). The various types of request messages sent from a Connection Manager to the IME are generically called a "REQ." Through the LES Management Interface ("LES Mgmt I/F") (1303), the IME Kernel (1302) controls the LES Equipment Controller ("LEQC") (1307). The LEQC in turns controls the ICE Channel Units (1308) at a given LES. The LEQC also interacts with the LES Event Manager ("LEVM") (1309), which records usage of ICE Channel Units in "Log Files". An ICE Statistical Engine ("ICE Stats Engine") associated with the LEVM (1309) prepares usage reports and statistical reports based on the Log Files. The reports are stored in a statistical reports database ("Stats DB"). Periodically, the Log Files and reports are processed by the Key and Reporting Engine (1310) and collected by the ICTI Server or the Master Licensor. The LEQC (1307) controls the ICE Channel Units (1308) in response to commands from the IME Kernel (1302), monitors status of the ICE Channel Units, and forwards ICE Channel Unit usage data (e.g., session start time, stop time, and data rate) to the LEVM (1309). The LES Management Interface (1303) translates ICE M&C messages into M&C messages used by a given LEQC (1307), and therefore enables a standardized IME Kernel to communicate with LEQCs tailored to a given LES environment. A large LES may have many ICE Channel Units. To off-load from the IME the routine message traffic related to ICE Channel Unit status and usage, the LEQC, LEVM, Log Files, ICE Stats Engine, and Stats DB are typically distributed to one or more server computers other than the LES Server host. The "Connection Manager" ("CM") software component (1311, 1312, 1313) is the human interface software used by a LESO customer (or by LESO personnel on behalf of a LESO customer) to manage the resources allocated to that LESO or LESO customer. A Connection Manager can be tailored to a given LESO or LESO customer. The Allocation Management Interface (1304) translates ICE M&C messages into M&C message used by a given Connection Manager, and enables a standardized IME Kernel to communicate with Connection Managers tailored to various LESO customer environments. The IME Kernel can use various network management methodologies, including the methodology described in the patent application entitled, "CAPACITY ALLOCATION SYSTEM USING SEMI-AUTONOMOUS NETWORK ELEMENTS TO IMPLEMENT AND CONTROL A TRANSMISSION SCHEDULE", PCT Application No. WO1999US01317 19990122, Publication date Jul. 29, 1999 commonly assigned with this application to Innovative Communications Technology, Inc. In an alternative embodiment, the IME Kernel can be written as processes in the database management system that manages the ICE DB.

The Resource Manager ("RM") (1306) is used by LESO personnel to configure and control the LES portion of the ICE Management System, LES resources, space segment, and earth segment used for ICE Services. The RM (1306) enables LESO personnel to define bulk space segment (e.g., transponder capacity leased from Inmarsat), to allocate bulk space segment to customer accounts (e.g., transponder bandwidth allocations, carrier center frequency allocations), to define (i.e., authorize and activate) ICE-enabled Terminals, to define ICE Channel Units, and to define LES backhaul ports, switching, and transport (terrestrial network facilities). Resources are classified as either dedicated (available for use by a single LESO customer) or group (available for use by all LESO customers, or a specific subset of customers). The RM includes a capability for managing more than one ICE-enabled Terminal time sharing, one ICE-enabled Terminal at a time, a common bandwidth allocation, an ICE Channel Unit, and backhaul resources, based on the receipt of REQs from a CM. A LESO customer does not necessarily have access to the current configuration of resources adjacent to the transponder bandwidth currently allocated to that customer. After receiving a REQ, the IME Kernel (1302) performs checks, using the data stored in the ICE DB (1305), to verify that other LESO customers and/or Inmarsat users will not be adversely impacted by implementing a REQ.

The ICE Management Gateway ("IMG") software application (1314, 1315) comprises an IMG Kernel (1316), one or more "ICE Management Gateway Interfaces (1317)," one or more "Terminal Interfaces (1318)," and is associated with one or more Connection Managers. The IMG Kernel (1316) is principally devoted to routing interprocess messages ("IPMs") and uses addressing, routing, and acknowledgement methods known in the art. IMGs performs all IPM routing between the IME (1301) and, through the IMG (1315) on the LES Server, the Connection Managers (1311, 1312, 1313) used by or for a LESO's customers. The originating software process of an IPM sends the IPM to the ICE Management Gateway with which it has an ICE M&C channel and the ICE Management Gateway routes the IPM towards the IPMs destination. The ICE Management Gateway Interface ("IMG I/F") (1317) sends and receives IPMs from one IMG to another IMG. A "Terminal Interface" ("Term. I/F") (1318) sends and receives IPMs (ECCs, EACs, and other messages) between an IMG and a given ICE-enabled Terminal (1320) when a real-time, interactive ICE M&C channel (e.g., full period frame relay, dialed-up async, etc.) is available. The Connection Manager ("CM" or "Conn. Mgr") manages the resources allocated to a given LESO customer (e.g., add, delete, or otherwise change a given traffic path) by submitting REQs and other messages to the IME. If a REQ from a CM (1312) is approved by the IME (1301), the IME replies to the IMG (1314) associated with the CM (1312) with an IPM that includes an ECC. The IMG Kernel (1316) uses that IPM to update the status of the REQ in the "Configuration Database" ("Config. DB") (1319) associated with the IMG (1314), and if a real-time, interactive M&C channel is available, delivers the ECC to the ICE-enabled Terminal (1320) identified in the REQ through a Terminal I/F (1318). When an EAC is received from the ICE-enabled Terminal (1320) through the Terminal I/F (1318), the IMG (1314) includes the EAC in an IPM to the IME (1301), and also updates the Config. DB (1319) with status. If the EAC is timely received by the IME, the IME (1301) sends to the IMG (1314) an IPM stating that resources will be released as requested in the relevant REQ, and the IMG Kernel (1316) updates the Config. DB (1319) with status of the REQ. In addition to information on pending REQs, the Config. DB (1319) contains information on active traffic paths. This information is accessible to a CM (1312, 1313) associated with the same IMG (1314) as the Config. DB (1319). The CM can periodically send IPMs to poll the IME to confirm active configurations involving the resources allocated to a LESO customer and obtain notices concerning traffic path conditions (e.g., warnings, path and device failures). The IME Kernel (1302) can also initiate IPMs to update Config. DBs at IMGs with information about active configurations and traffic path conditions.

If a real-time, interactive ICE M&C channel between an IMG and an ICE-enabled Terminal is not available, and only a stand-alone ICE M&C channel is available, in response to an approved REQ, the IME sends an IPM including an ECC to the CM that submitted the REQ. A user of that CM (or another CM serving that LESO customer) must intervene to forward the ECC through the stand-alone ICE M&C channel to the relevant ICE-enabled Terminal, and upon receipt of an EAC in response to the ECC, the user of a CM serving that LESO customer must intervene to forward the EAC to the IME. If IPMs other than ECCs and EACs must be exchanged with an ICE-enabled Terminal that has only a stand-alone ICE M&C channel, human intervention using a CM is required to exchange such IPMs. Such intervention could be to handle IPMs by fax, telephone, telex, telegraph, or mail.

The CM provides a human user interface to view connection-resource allocations (past, present, or future), change connection-resource allocations, distribute ECCs to ICE-enabled Terminals and EACs to the IME manually, track ECC/EAC distribution, and configure ICE M&C channels for ICE-enabled Terminals. Thus, the IME exchanges messages with the CM to facilitate the viewing, planning, and implementation of connection-resource allocations. The IME exchanges messages through a Terminal Interface of an IMG to facilitate the distribution of ECCs and EACs between the IME and ICE-enabled Terminals. One type of REQ, a "Current Allocation Request" IPM, enables the CM to request the allocation of connection resources for a specified customer in a specified ocean region for a specified period of time. The Current Allocation IPM contains a description of the connection resources (space segment, ICE Channel Units, and LES backhaul ports) allocated to the ICE-enabled Terminals of a specified customer in a specified ocean region for a specified period of time. The Current Allocation Request IPM contains all of the information necessary to reallocate connection resources among the ICE-enabled Terminals belonging to the LESO customer in a given ocean region. A "Resource Status" IPM communicates status changes for the LES resources (ICE Channel Units and backhaul ports) allocated to a LESO customer in an ocean region. An "Allocation Request" IPM describes a connection-resource allocation change made by an LES or NOC operator for the ICE-enabled Terminals in a specific ocean region. An "Allocation Reply" IPM is sent by the IME to a CM in response to an Allocation Request IPM received from that CM. The Allocation Reply IPM describes any problems found in the Allocation Request. If no problems were found, the Allocation Reply IPM content is simply "OK". A "Configuration Distribution" IPM contains one or more ECCs. Each ECC is intended for a specific ICE-enabled Terminal. An ECC is generated by an IME and sent to the CM that requested the resource allocation represented by the ECCs. The Configuration Distribution message is also sent to each Terminal Interface managing any of the ICE-enabled Terminals referenced in the message. An "Acknowledgement Distribution" IPM contains EACs (Encrypted Acknowledgement Codes) received from one or more ICE-enabled Terminals.

FIG. 13 also shows that a given NOC Server may be associated with a plurality of LES Servers. In FIG. 13, a NOC Server has CMs (1312, 1313) supporting ICE-enabled Terminals in both the Pacific Ocean Region ("POR") (1321) and in the Atlantic Ocean Region ("AOR") (1320).

Figure 14:
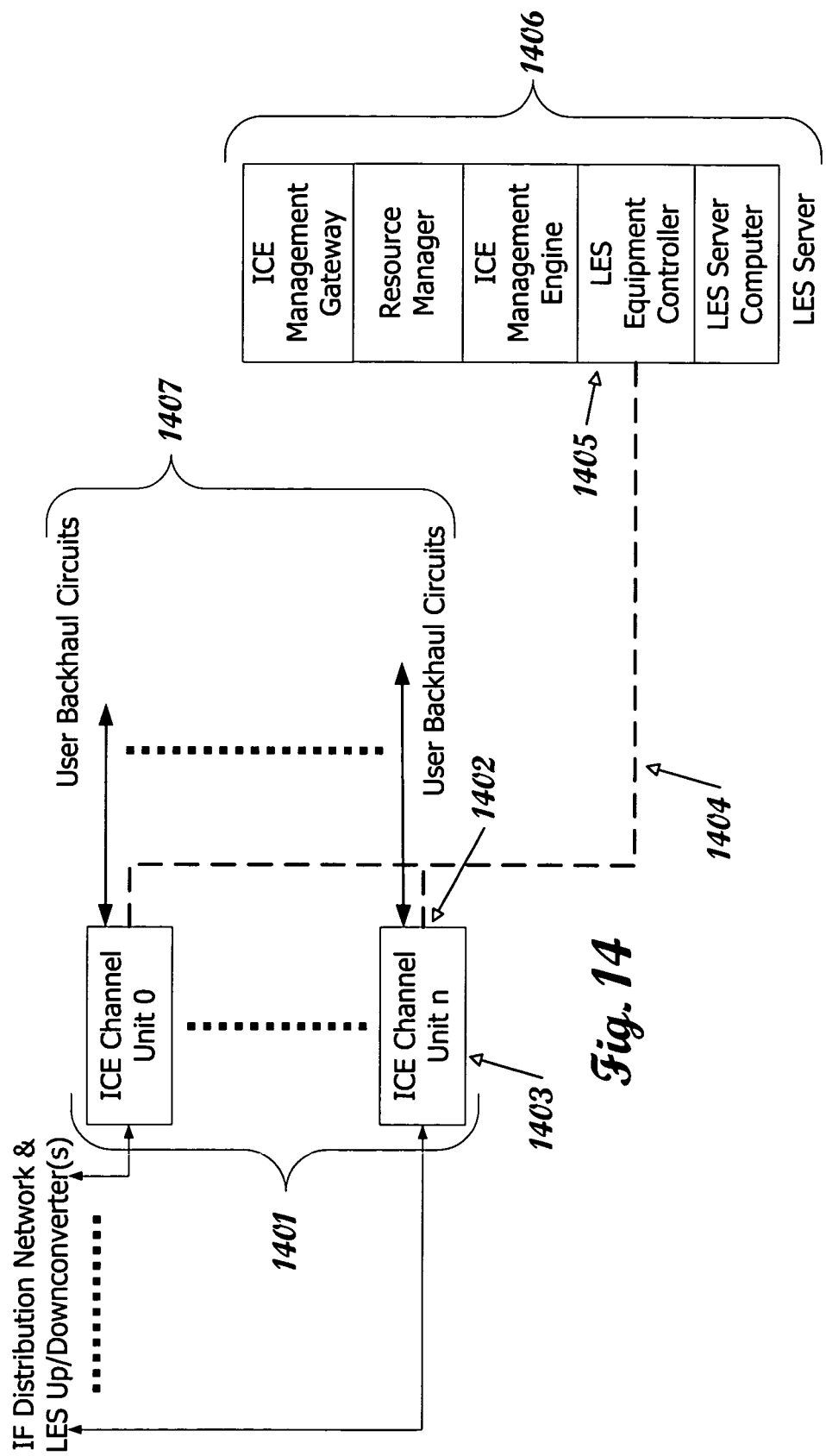
FIG. 14 illustrates the ICE Channel Unit and associated M&C path.

As shown in FIG. 14, for each remote Inmarsat-B ICE MES Retrofit, there is a counterpart ICE Channel Unit allocated from a pool of ICE Channel Units (1401) providing satellite communications services to the remote Inmarsat-B ICE MES Retrofit. Inmarsat-B services use C-band paths between an LES and an Inmarsat satellite (including both operational and lease satellites), and L-band paths between an Inmarsat satellite and an MES. The ICE Channel Unit used with Inmarsat-B ICE MES Retrofits comprises an Inmarsat compliant, programmable satellite modem with 70 MHz intermediate frequency ("IF") and internal microcontroller, an M&C interface, and the ability to be configured through the M&C interface by exchange of ICE M&C messages with an ICE Server. The ICE Channel Unit normally used is an EFData SDM-300A ("EFData 300A"), which supports various modulation methods, FEC rates, and Reed-Solomon error correction. The EFData 300A modem is manufactured by Comtech EFData, 2114 West 7th Street, Tempe, Ariz. 85281 (www.efdata.com") and has a 70 MHz IF transmit/receive interface. A transmit port interfaces with an upconverter, and a receive port interfaces with a downconverter, in a manner known in the art. Use of upconverters and downconverters provide the C-band interface required by an HPA (transmit path) and LNA (receive path) at an LES. From the remote control I/O port (1402) of an ICE Channel Unit (1403), ICE M&C messages are routed via an ICE M&C channel (1404) that interconnects the ICE Channel Unit (1403) and the LES Equipment Controller (1405) on the LES Server (1406) for that LES. Encryption is not normally applied to ICE M&C messages exchanged between an ICE Server and a ICE Channel Unit. To configure and manage ICE Services, the ICE Server exchanges ICE M&C messages with the ICE Channel Unit and with the Embedded DSP in each Inmarsat-B ICE MES Retrofit with which the ICE Channel Unit shares a traffic path. The M&C channel between the ICE Channel Unit and the ICE Server uses a real-time interactive path. In the event of a failure of a given ICE Server, the ICE management duties of the failed ICE Server are assumed by a redundant ICE Server at the same LES or by a redundant ICE Server at a different LES. The ICE M&C channel to a given MES Embedded DSP may be a standalone, non-real-time M&C channel, so an ICE Server does not necessarily exchange messages directly with an Embedded DSP. If an ICE M&C channel is available on a real-time, interactive path between a LES Server and an Embedded DSP via a NOC Server, the LES Server and Embedded DSP can exchange M&C messages via the NOC Server. Although a user of ICE Services may own Inmarsat-B ICE MES Retrofits (or other ICE MES embodiments discussed below), a user is normally not permitted to directly control equipment that is used for ICE Services at an MES or LES.

The packaging and user interfaces of the components of an ICE Channel Unit for Inmarsat-B ICE Services differ from the packaging and user interfaces of an ICE-enabled Terminal since trained operators, rather than users, are responsible for the equipment at an LES. Whereas a ship may only have, a single MES, an LES may serve hundreds or thousands of MESs and have its Inmarsat-B electronics in a dense packaging form, such as rack-mounted chassis, each chassis having circuit boards that serve a series of MESs. Packaging of the components of an Inmarsat-B ICE Channel Unit is normally in a similarly dense packaging form, such as rack-mounted chassis. The DSP Board used in an Inmarsat-B ICE MES Retrofit is not required in an ICE Channel Unit since transmit and receive paths, DC power, and M&C channels are not diplexed onto a single RF path at an LES. Instead, IF combiners and amplifiers, if needed, are used to frequency multiplex multiple transmit carriers onto a single transmit path which is connected to one or more upconverters and then to an HPA. In the receive path, LNA output is fed to one or more downconverters, which then feed dividers and amplifiers, if needed, to provide multiple receive paths to the receive port of a given ICE Channel Unit. The LES connects Inmarsat-B MES users (including users of Inmarsat-B ICE MES Retrofits) to terrestrial network nodes using backhaul traffic paths (1407). The LES can also interconnect such users to other MES users (including users of Inmarsat-B ICE MES Retrofits) served by that LES, for instance, for ship-to-ship dial-up calls or ship-to-ship leased slot services. In a given leased slot, the transmitter for the forward carrier (shore-to-ship) at the LES and the receiver for the forward carrier at the Inmarsat-B ICE MES Retrofit are configured for the same combination of FEC and Reed Solomon ("RS") error correction. Similarly for the return carrier (ship-to-shore), the transmitter at an Inmarsat-B ICE MES Retrofit and the receiver at the LES are configured for the same combination of FEC and RS. For Standard Services, the forward and return carriers are configured to occupy the same bandwidth and operate at the same data rate. However, this one-for-one relationship between the forward and return carriers is not a requirement for ICE Services and differing data rates and/or FEC and RS configuration options may be used to meet the requirements of the application. For instance, a user may use asymmetric ICE Services in which two or more Inmarsat-B ICE MES Retrofits share given leased bandwidth (one or more slots), and the transmit and receive data rates and bandwidths are different for the forward and return carriers.

Figure 15:
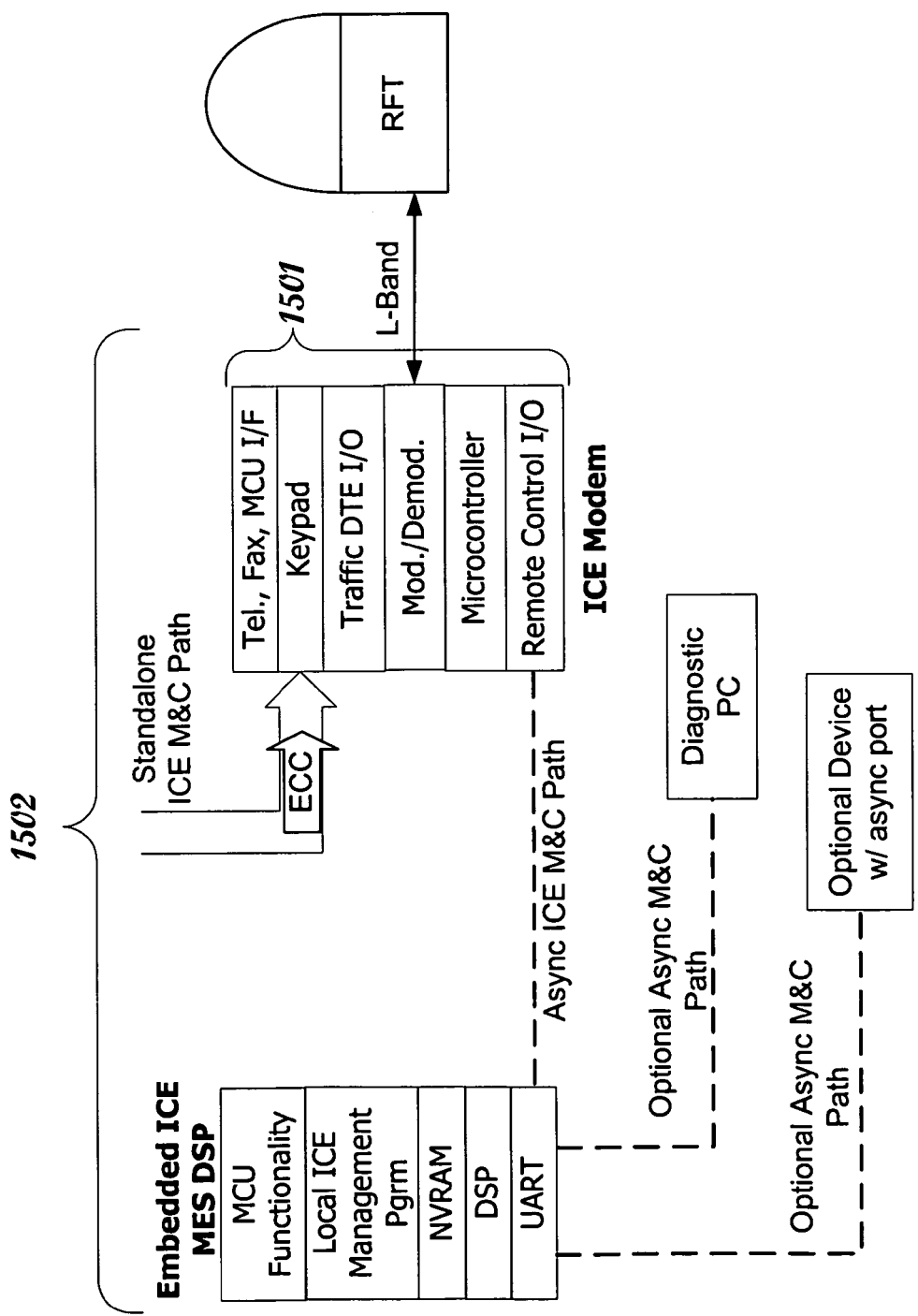
FIG. 15 illustrates an Inmarsat-B ICE MES that uses a single modem to provide both ICE and standard Inmarsat-B functionality.

As shown in FIG. 15, a second preferred embodiment of the ICE invention uses a single ICE Modem (1501) to provide both ICE and standard MES functionality ("Integrated ICE MES"). An Integrated ICE MES (1502) that complies with Inmarsat-B specifications ("Inmarsat-B ICE MES") will be used to illustrate this embodiment. An Inmarsat-B ICE MES can replace an existing Inmarsat-B MES or be used for a new installation. In the Inmarsat-B ICE MES, the diplexer/switch is not needed. All other components and paths on the DSP Board are retained in the Inmarsat-B ICE MES except for the diplexers, entry switch, exit switch, and the paths and peripheral devices (e.g., dividers, combiners, low pass filter) associated with inserting the diplexers into the RF path on the DSP Board. All standard Inmarsat-B MES components other than a standard modem are contained in an Inmarsat-B ICE MES. The ICE Modem in an Inmarsat-B ICE MES is programmable and can function both in Standard Services mode and in ICE mode. The embedded computer ("Embedded ICE MES DSP") and control paths in the Inmarsat-B ICE MES replace the MCU microcontroller and control paths in a standard Inmarsat-B MES. In addition to the ICE Services instruction and data set, the instruction and data set of the Local ICE Management Program of the Inmarsat-B ICE MES includes the instructions and data required to provide Inmarsat-B Standard Services. Using the telephone, fax port, MCU functionality included in the ICE Modem and Embedded ICE MES DSP, the Inmarsat-B ICE MES can send and receive standard voice, fax, and data dial-up calls using an operational satellite, provide HSD in a leased slot, or provide ICE Services a leased slot. Dial-up calling requires a real-time exchange of control messages (e.g., signaling and supervision messages) between the Inmarsat-B ICE MES and an Inmarsat NCS or standalone ACSE to set-up calls and between the Inmarsat B ICE MES and an LES ACSE to tear down calls. Optionally, once a dial-up data call is established using standard Inmarsat-B call set-up procedures over an operational satellite, calls between an Inmarsat-B ICE MES and an LES can either stay in standard Inmarsat-B modes or switch to ICE Services, i.e., higher data rates for a given bandwidth compared with standard data rates.

Figure 16:
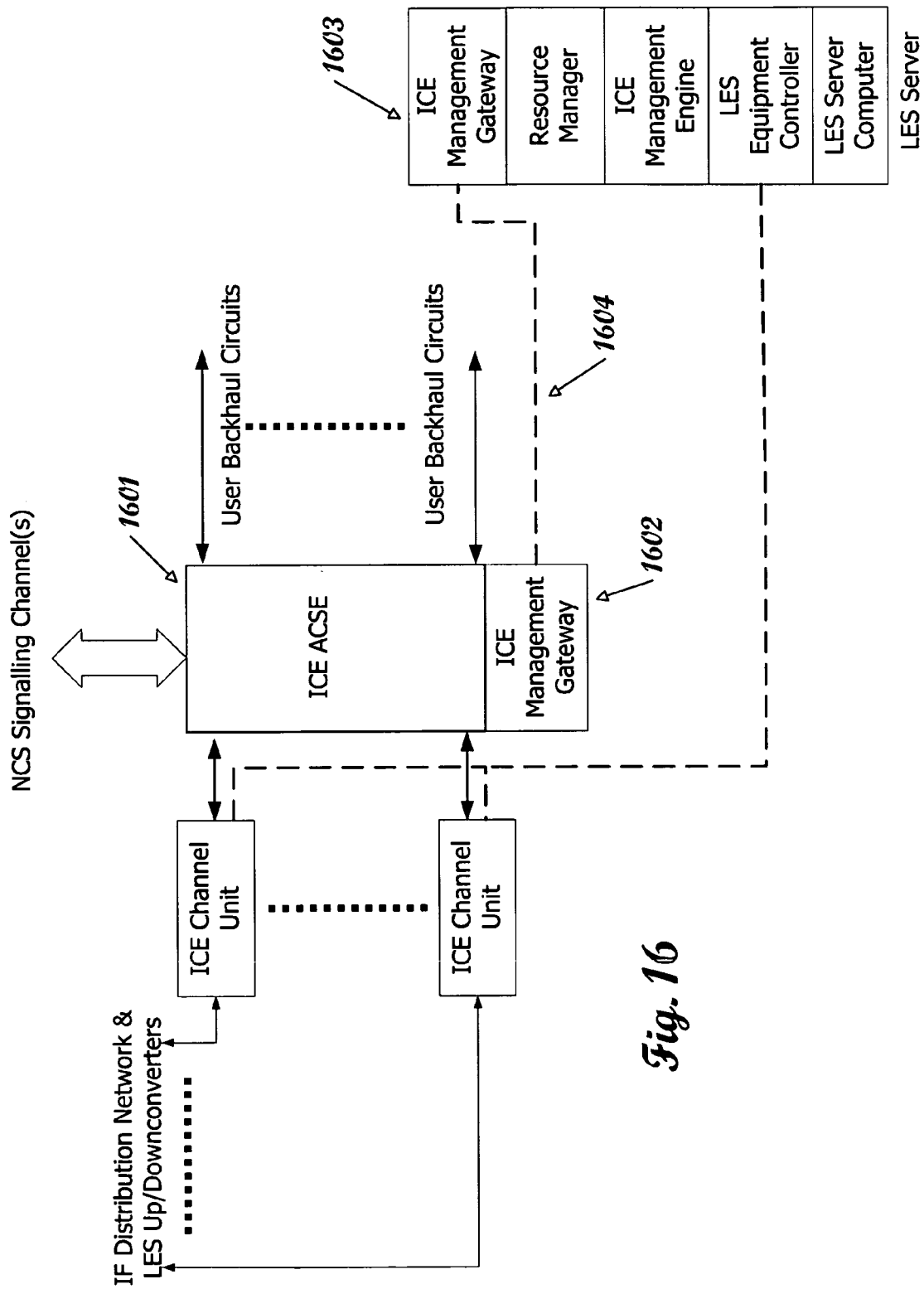
FIG. 16 illustrates the ICE ACSE used in conjunction with an Inmarsat-B ICE MES.

As shown in FIG. 16, to support this optional capability to switch between standard data rates and higher data rate ICE Services (and vice versa) during a single dial-up call, or to place a dial-up call that uses ICE Services from the completion of call set-up, the ACSE in the relevant LES is augmented or replaced by an ICE-enabled ACSE that provides standard ACSE functionality for Standard Services and, for ICE Services using operational satellites, operates similarly to the standard ACSE with respect to communications with the NCS (e.g., maintains "busy tables" and notifies the NCS as needed) ("ICE ACSE") (1601). The ICE ACSE exchanges standard M&C messages between an ICE Management Gateway (1602) that is part of the ICE ACSE (1601) and an ICE Management Gateway (1603) on the LES Server using an M&C channel (1604). The ICE ACSE exchanges standard M&C messages with standard Inmarsat-B MESs for Standard Services (including an HSD call on an operational satellite), and exchanges ICE M&C messages with Inmarsat-B ICE MESs for ICE Services. In addition to a plurality of ICE M&C messages, ICE Services use a subset of standard Inmarsat M&C messages called "Signalling Units". The only Signalling Unit ("SU") normally required by ICE Services over a lease satellite is the transmission of the "Standalone Status" SU periodically on the CESAL carrier. When handling ICE Services calls, or switching between ICE Services and Standard Services (and vice versa) calls, using an operational satellite, the ICE ACSE communicates with the NCS in a manner that keeps the RF and traffic path allocation "busy" without using the standard method of monitoring the SUs normally passed in-band over the traffic path. This method of spoofing NCS M&C messages and channels ("NCS spoofing") obviates the need to pass SUs in-band when using operational satellites. In the preferred method of NCS spoofing, the ICE ACSE maintains its "busy table" monitored by the NCS based simply on "carrier detect" status from the ICE Channel Unit allocated to a given traffic path. An alternative method of NCS spoofing emulates the existing methodology by implementing in a traffic path an in-band channel, or using an external network path, to deliver SUs to communicate a "busy" state for the traffic path. For all ICE Services using a lease satellite, there is no need for NCS spoofing.

To support an optional capability to switch between dial-up ICE Services and full-period (lease mode) ICE Services in a leased slot, an ICE ACSE described above and associated with a given LES is augmented with the ability to exchange ICE M&C messages for combined lease and dial-up operations in a given leased slot with Inmarsat-B ICE MESs. Even though an ACSE is normally not involved with leased slots, it is involved in completing calls through the backhaul (terrestrial) network serving the LES associated with the ICE ACSE. Therefore, the ICE ACSE receives and processes call requests to and from an Inmarsat-B ICE MES using a leased slot with methods known in the art, particularly methods similar to the RA/TDMA request channel that is used by a standard ACSE for standard Inmarsat-B dial-up services. Packetized voice or other technique, rather than analog voice, would normally be used to provide voice calling using ICE Services in a leased slot. In this ICE embodiment, a given leased slot is normally allocated between dialup and full period services based on multiplexing techniques known in the industry, as opposed to bandwidth (feeding a full-period carrier and a second dial-up carrier to a single HPA introduces objectionable intermodulation products in the HPA output). This allocation between full-period and dial-up ICE Services can be fixed or dynamic under the control of the ICE Management System. If a user does not use an external device that multiplexes voice and data before being connected to the DTE port of an Inmarsat-B ICE MES to provide voice services, single user dial-up voice services can be provided by use of the telephone handset and voice codec included in an Inmarsat-B ICE MES.

A third optional capability of an Inmarsat-B ICE MES is switching between ICE Services and standard HSD service while using a leased slot. HSD supports a few features that ICE Services do not without additional equipment and/or software. For example, the 64 kbps bitstream of HSD is designed to connect to a 64 kbps ISDN B channel, so a user can easily interconnect an HSD channel with ISDN service. However, the more varied data rates of ICE Services may result in a different backhaul solution that does not support dial-up ISDN. Therefore, a user might use standard HSD when there is a need to dial into a location that has ISDN capability, and use ICE Services when the higher speed backhaul capability required by ICE Services has been implemented at the desired destination location. An ICE ACSE supports HSD calls to and from an Inmarsat-B ICE MES using a lease satellite in the same way as the ICE ACSE supports HSD calls to and from an Inmarsat-B ICE MES using a operational satellite, as discussed above.

ICE Channels Units are used at the LES to provide ICE Service to Inmarsat-B ICE MESs. The ICE Channels Units shown in FIG. 16 have the same M&C paths and channels as those shown in FIG. 14. ICE Channels Units can be configured through the M&C interface on the ICE Channel Unit to work as the LES node in satellite communications paths to Inmarsat-B ICE MES Retrofits, to Inmarsat-B ICE MESs, and optionally, to standard Inmarsat-B MESs. An ICE ACSE (1601) would normally not allocate an ICE Channel Unit capable of ICE Service for use in a traffic path where a standard modem can be used. Analogous to the implementation of ICE Service for leased slot operations, higher data rates for dail-up calls are obtain by implementing combinations of forward error correction, Reed Solomon error correction or other error correction such as "Turbo FEC" in ICE Modem at the Inmarsat-B ICE MES and in the ICE Channel Unit. In a given call or leased slot service, the same combination of forward error correction and Reed Solomon error correction or "Turbo FEC" is implemented at the Inmarsat-B ICE MES and at the ICE Channel Unit. Switching to ICE Services in a dial-up call or in a leased slot requires an exchange of ICE M&C messages among the ICE Server, the Embedded ICE MES DSPs, and the ICE Channel Unit involved in a given Inmarsat-B traffic path. At 64 kbps, Viterbi FEC concatenated with Reed-Solomon error correction introduces a delay of 0.5 seconds. At 128 kbps, Viterbi FEC concatenated with RS introduces about 0.25 seconds delay. If such delay is an issue, Reed Solomon error correction is not used. As an alternative, rate 3/4 Turbo FEC may be used, which provides the same 128 kbps data rate in the same 100 kHz bandwidth, but with no additional delay. Any backhaul circuits at the LES serving the Inmarsat-B ICE MES must be capable of handling the higher data rates provided by ICE Services. ICE Services can include encryption of traffic through optional processors described below, so that a standard call can become encrypted when switched to ICE Services.

When not engaged in a dial-up call, the Inmarsat-B ICE MES can provide standard HSD lease services or ICE services in a leased slot. Since the Inmarsat-B ICE MES has direct control of the HPA, and the HPA need not be the same as is used with the Saturn B MES, the Inmarsat B ICE MES can be designed around an HPA that does not require a constant envelope waveform, and ICE Services can use waveforms other than constant envelope without triggering an error condition that would require the HPA to be turned off. The Embedded ICE MES DSP controls all M&C and payload paths in an Inmarsat-B ICE MES, and can therefore introduce an optional real-time, interactive, in-band ESC ICE M&C channel into the traffic path between the Inmarsat-B ICE MES and the corresponding Inmarsat-B ICE Channel Unit. Alternatively, an optional real-time, interactive ICE M&C channel can be implemented through an external network path, as described below. The combination of the preferred method of "NCS spoofing", as described above, of the NCS M&C messages and channels by a modified ICE ACSE and the standalone ICE M&C channel design enables standalone operation in the absence of an real-time, interactive ICE M&C channel. If available, the ESC (or other ICE M&C channel) can be used to exchange all types of ICE M&C messages, as described above, including messages for real-time power level adjustments and changes in modulation method, FEC, Reed-Solomon error correction, encryption, etc.

Figure 17:
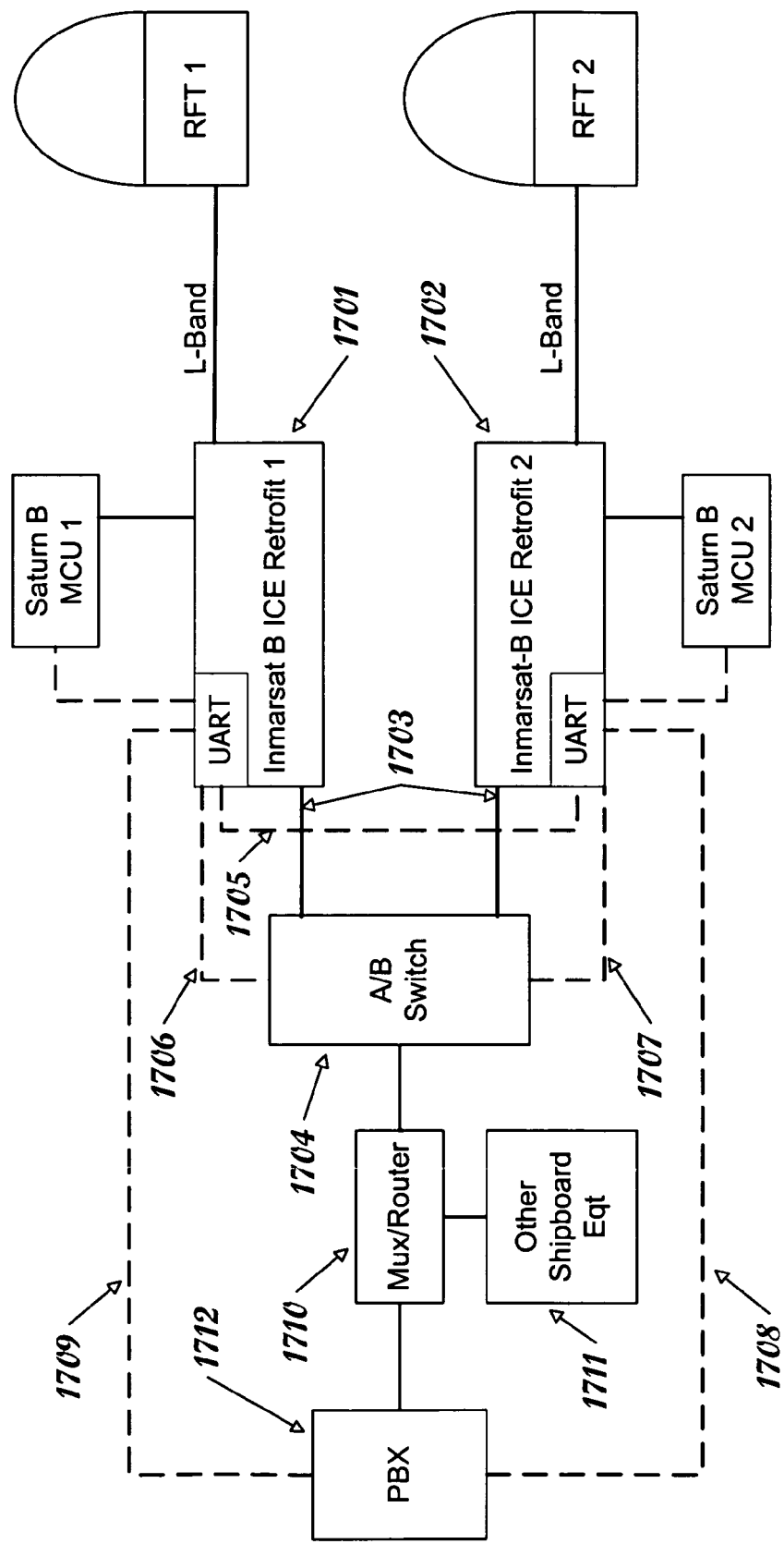
FIG. 17 illustrates two Inmarsat-B ICE MES Retrofits in a redundant configuration.

As shown in FIG. 17, a third preferred embodiment of the ICE invention couples two ICE retrofit embodiments (1701, 1702) in a redundant configuration for Inmarsat-B service. A redundant configuration is desirable to counteract interruptions due to antenna blockages or equipment failures. In some installations of RF terminals on ships, depending on the orientation of a ship in relationship to an orbital satellite providing service to the RF terminal, the superstructure of a ship or other obstruction can interrupt a transmission between the satellite and an MES. In this third preferred embodiment, the same baseband input and output signals (1703) are supplied to an A/B switch (1704), which in turn provides the baseband signals to one of a pair of two Inmarsat-B ICE MES Retrofits. Only one of the pair provides ICE Services and receives baseband input at a given time. The Embedded DSP in a first Inmarsat-B ICE Retrofit in the pair communicates with the other Embedded DSP in the pair over an async ICE M&C path (1705) through a port of the UART in each Embedded DSP to compare received signal strength data. Each Embedded DSP also communicates with the A/B Switch (1704) over a separate async ICE M&C path (1706, 1707) using a port of the UART in such Embedded DSP to control switching by the A/B Switch (1704). The ICE Modem provides received signal strength data to the Embedded DSP controlling it. The instruction and data set of the Local ICE Management Program is expanded to include the instructions and data required to determine which of the two Inmarsat-B ICE Retrofits is receiving the stronger signal from the lease satellite providing service, and if the received signal strength at one of the Inmarsat-B ICE Retrofits in the pair exceeds the received signal strength at the other Inmarsat-B ICE MES Retrofit in the pair by a selectable threshold amount, and if the Inmarsat-B ICE MES Retrofit with the weaker received signal strength is active (i.e., in ICE ON mode) in providing connectivity to the LES, the Local ICE Management Program switches the Inmarsat-B ICE MES Retrofit with the stronger received signal strength into ICE ON mode (i.e., it becomes the active one of the pair providing connectivity to the LES) and switches the Inmarsat-B ICE MES Retrofit with the weaker received signal strength into ICE OFF mode. The Local ICE Management Program making the off-line Inmarsat-B ICE MES Retrofit the active terminal in a redundant pair of Inmarsat-B ICE MES Retrofit ("Handover") also occurs as a result of detection by the Local ICE Management Program of fault conditions in the on-line Inmarsat-B MES Retrofit. Fault conditions that would trigger Handover include a loss of demodulated signal, component failure, or differentially and rapidly deteriorating signal quality in the on-line Inmarsat-B ICE MES Retrofit versus the off-line Inmarsat-B ICE MES Retrofit.

In a marine MES environment, a plurality of user communications devices are often combined and connected to an MES. FIG. 17 illustrates the bitstreams from a PBX (1712) and other shipboard equipment (1711) being combined in a multiplexer or router (1710), which is in turn connected to the A/B Switch (1704). In this configuration, the PBX can provide an async data port (by attaching a dial modem to a voice card on the PBX) through which an optional real-time ICE M&C channel (1708, 1709) can be connected to each Embedded DSP in the redundant pair of Inmarsat-B ICE MES Retrofits.

Figure 18:
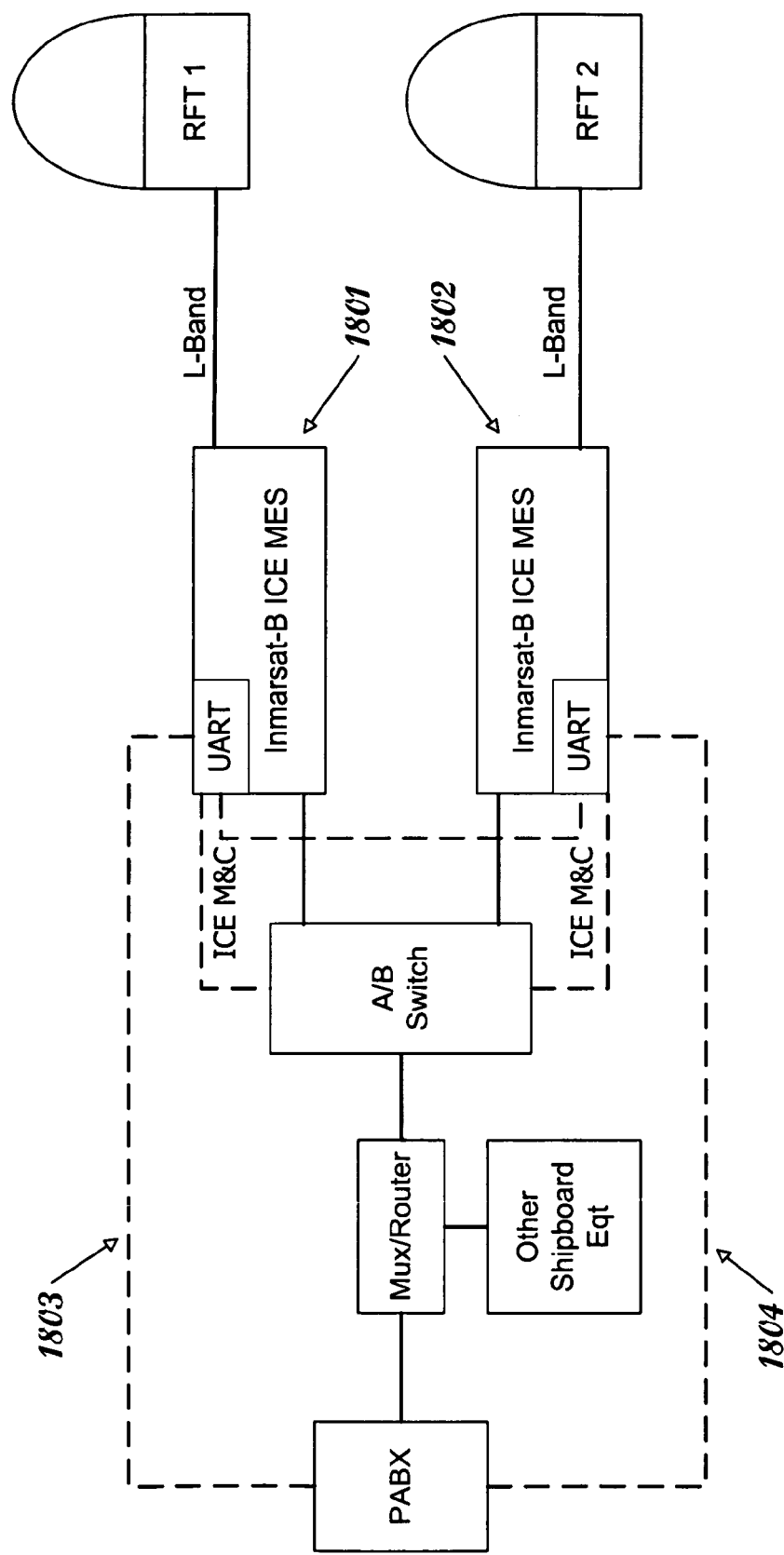
FIG. 18 illustrates two Integrated ICE MESs in a redundant configuration.

As shown in FIG. 18, a fourth preferred embodiment of the ICE invention couples two Integrated ICE MESs (including without limitation Inmarsat-B ICE MESs) in a redundant configuration in the same way as in the third preferred embodiment. In this fourth preferred embodiment, the same baseband input and output signals are supplied to a pair of two Integrated ICE MESs (1801, 1802). Management, control, and operation of the configuration in FIG. 18 is the same as in FIG. 17. Only one of the pair provides ICE Services or Standard Services at a given time. The Embedded ICE MES DSP in a first Integrated ICE MES in the pair communicates with the other Embedded ICE MES DSP in the pair through a port of the UART in each Embedded ICE MES DSP. The ICE Modem provides received signal strength data to the Embedded ICE MES DSP controlling it. The instruction and data set of the Local ICE Management Program is expanded to include the instructions and data required to determine which of the two Integrated ICE MESs is receiving the stronger signal from the lease or operational satellite providing service, and if the received signal strength at a first Integrated ICE MES in a pair exceeds the received signal strength at the other Integrated ICE MES in the pair by a selectable threshold amount, and the Integrated ICE MES with the weaker received signal strength is active (i.e., in ICE ON mode) in providing connectivity to the LES, the Local ICE Management Program switches the Integrated ICE MES with the stronger received signal strength into ICE ON mode (i.e., it becomes the active one of the pair providing connectivity to the LES) and switches the Integrated ICE MES with the weaker received signal strength into ICE OFF mode. The Local ICE Management Program making the off-line Integrated ICE MES the active remote terminal in a redundant pair of Integrated ICE MESs ("Handover") also occurs as a result of detection by the Local ICE Management Program of fault conditions in the on-line Integrated ICE MES. Fault conditions that would trigger Handover include a loss of demodulated signal, component failure, or differentially and rapidly deteriorating signal quality in the on-line Integrated ICE MES versus the off-line Integrated ICE MES. As in the configuration illustrated in FIG. 17, the PBX can provide real-time, interactive ICE M&C channels (1803, 1804) to the Inmarsat-B ICE MESs (using a dial modem attached to a voice card on the PBX).

An alternative redundant ICE embodiment is the coupling of an Inmarsat-B ICE MES and an Inmarsat-B ICE MES Retrofit. Management, control, and operation is the same as described for the third and fourth ICE embodiments above.

Figure 19:
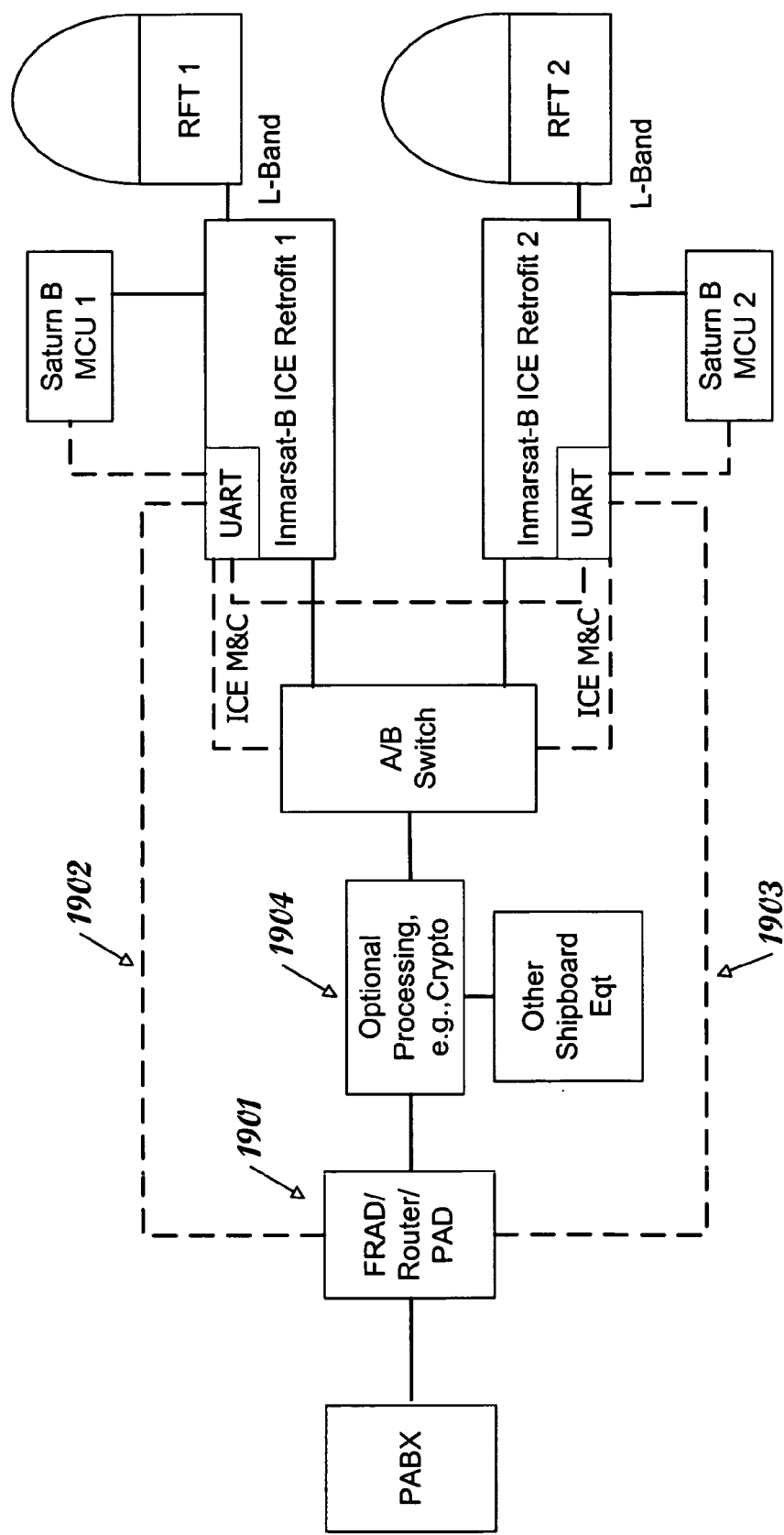
FIG. 19 illustrates the use of an Inmarsat-B ICE MES Retrofit with a Packet M&C Device.

As shown in FIG. 19, a pair of Inmarsat-B ICE MES Retrofits in a redundant configuration as described for the third and fourth ICE embodiments can be used with an external, packet-based, multiplexing device such as a frame relay access device ("FRAD"), Internet Protocol router, or X.25 packet assembler-disassember/switch (each, a "Packet M&C Device") (1901) to provide a real-time ICE M&C channel (1902, 1903) to each Inmarsat-B ICE MES Retrofit. To implement this embodiment, an async port on the Packet M&C Device is connected to a UART port on the Embedded DSP of the Inmarsat-B ICE MES Retrofit and a second Packet M&C Device is connected to the ICE Channel Unit (directly at the LES, or indirectly at a customer location via backhaul terrestrial connections from the customer location to the LES) engaged in a traffic path with that Inmarsat-B ICE MES Retrofit. On the LES side (or customer location, depending on the location of the Packet M&C Device), the real-time ICE M&C channel extends from the ICE M&C port on the Packet M&C Device to an ICE M&C port on the relevant ICE Server or NOC Server. Real-time ICE M&C messages are exchanged using this real-time ICE M&C channel in the same manner as an ESC real-time ICE M&C channel is used by an Inmarsat-B ICE MES and ICE Channel Unit. If an Inmarsat-B ICE MES Retrofit is used alternately for dial-up and leased services, a real-time, interactive management channel is helpful to manage and control transitions between dial-up and leased mode service. The Packet M&C Device (1901) can be connected to optional processing equipment, such as encryption equipment (1904), which in turn is connected to the A/B Switch. This ICE embodiment can also couple a pair of Inmarsat-B ICE MESs instead of two Inmarsat-B ICE MES Retrofits, or can couple an Inmarsat-B ICE MES and an Inmarsat-B ICE MES Retrofit instead of two Inmarsat-B ICE MES Retrofits. Other than the use of the Packet M&C Device to provide real-time ICE M&C channels, management, control, and operation is the same as described for the third and fourth ICE embodiments above.

Figure 20:
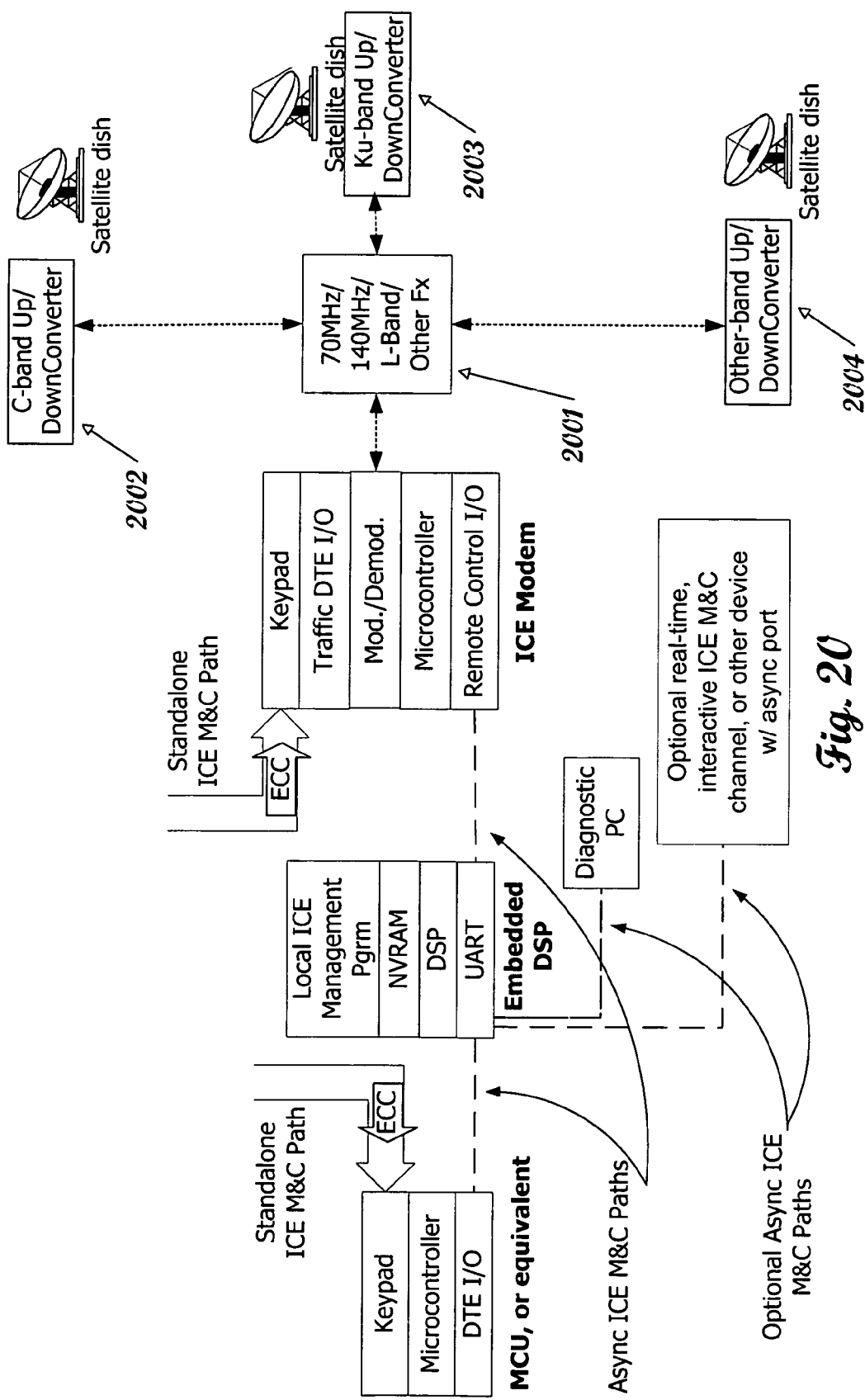
FIG. 20 illustrates retrofit embodiments of the ICE invention for satellite communications uses other than Inmarsat-B.

As shown in FIG. 20, other ICE embodiments based on the Inmarsat-B ICE MES Retrofit can be used to retrofit earth stations used for services other than the C-band forward path/L-band return path used by Inmarsat-B. Most hub earth stations, such as LESs, use satellite modems with a uniform 70 MHz IF interfaces (in some cases, other IF frequencies, such as 140 MHz, are used) (2001). Converting transmit and receive paths between IF frequencies and uplink/downlink frequencies ("Satlink Frequencies") at hub earth stations works as described above in the discussion of the IF frequency to C-band Satlink Frequencies conversions associated with the ICE Channel Unit, except the Satlink Frequencies in these other ICE embodiments are a band other than C-band (e.g., Ku-band, Ka-band). ICE embodiments in remote terminals can also use upconverters and downconverters under the control of the ICE Inmarsat-B MESs. In such retrofit ICE embodiments, upconverters and downconverters (2002, 2003, 2004) are inserted between the transmit port and receive port, respectively, of the second diplexer and the ICE Modem on the DSP Board. One or more upconverters convert the IF frequency of the transmit output of the ICE Modem to the uplink Satlink Frequency. One or more downconverters convert the downlink Satlink Frequency to the IF frequency of the receive input of the ICE Modem in a manner known in the art. For instance, in a retrofit embodiment for a Ku-band earth station, an ICE Modem with a 70 MHz band intermediate frequencies would be equipped with upconverters to match the 14 GHz uplink band, and downconverters to match the 12 GHz downlink band (2003). The ICE Management System, including the ICE Server and the Embedded DSP in each ICE remote terminal embodiment, would operate in the manner described for the Inmarsat-B ICE MES Retrofit and Inmarsat-B ICE MES described above, and also manage and control the upconverters and downconverters used in a given embodiment. In these ICE embodiments, instructions and parameters specific to upconverters and downconverters are included in ICE M&C messages, or by embedding logic in the Local ICE Management Program running on the Embedded DSP on the DSP Board. Other than the upconversion and downconversion between IF and Satlink Frequencies, a remote terminal ICE embodiment based on the Inmarsat-B ICE MES Retrofit operates the same as an Inmarsat-B ICE MES Retrofit. The use of the ICE Management System, particularly ECCs, disabling local user control of critical modem parameters, standalone M&C channels, and optional real-time M&C channels, is as novel in non-Inmarsat satellite services as it is in Inmarsat satellite services.

Figure 21:
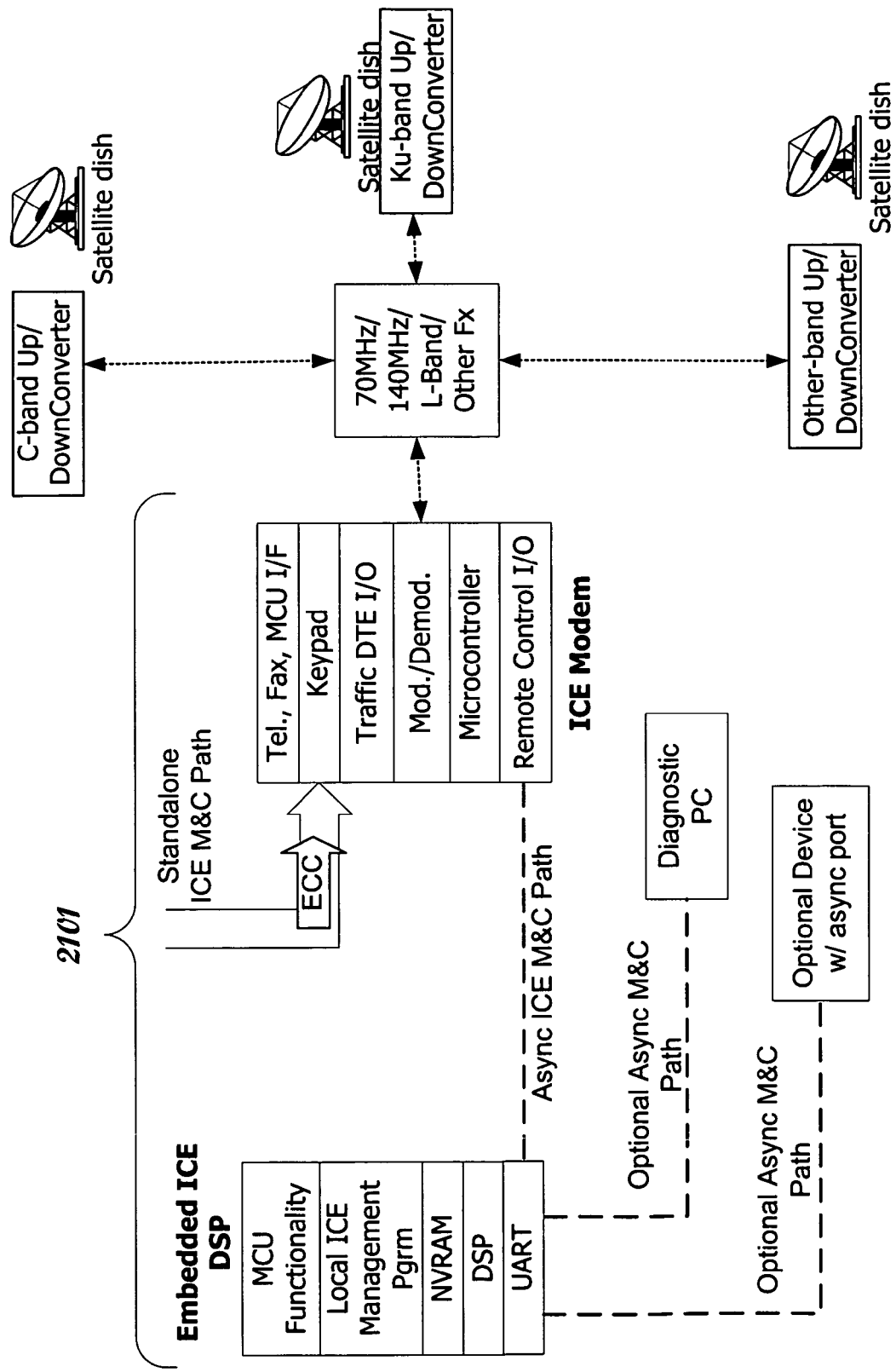
FIG. 21 illustrates integrated embodiments of the ICE invention for satellite communications uses other than Inmarsat-B.

As shown in FIG. 21 an Integrated ICE MES (2101) can be used for services that use frequencies other than the C-band forward path/L-band return path used by Inmarsat-B. This ICE-enabled Terminal uses an "Embedded ICE DSP" that provides, manages, and controls functionality used by standard remote earth stations for various standard service types, upconverters and downconverters (embedded on the DSP Board, or external to the DSP Board) to operate at given Satlink Frequencies, and is functionally equivalent to the embodiment in FIG. 20 except a single ICE Modem is used (no standard modem is included) and the functionality of the MCU or equivalent indoor equipment is consolidated in the Integrated ICE MES.

If data compression of the traffic bitstream has not been performed by the user externally, data compression can be performed by a second processor mounted on the DSP Board. Other types of processing of the traffic bitstream, such as packet routing or frame relay access, can optionally be performed in an ICE embodiment by including a router or frame relay access device, respectively, on the DSP Board. If such other traffic bitstream processor is used, e.g., data compressor, router, frame relay access device (collectively, "Baseband Processor"), the user's input signal is applied to the Baseband Processor input, and the Baseband Processor output is applied to the ICE Modem input. The Baseband Processor also performs data decompression, routing, frame relay access, as the case may be, on the receive baseband signal. Integrated, as opposed to retrofit, embodiments of the ICE embodiments described in this and the preceding paragraph would not use the pair of diplexers and the entry and exit switches required for retrofit embodiments in the same manner as an Integrated ICE MES does not require a pair of diplexers and the entry and exit switches that an Integrated ICE MES retrofit requires. To use any of the preceding remote terminal embodiments in a traffic path, an equivalent ICE embodiment is required at the hub earth station (or second remote terminal, if link budgets support such connectivity) with which the remote terminal establishes a traffic path. The ICE Management System has ICE M&C channels between an ICE Server and the ICE embodiments described in this and the preceding paragraph and uses ICE M&C messages to configure via the Embedded DSPs the upconverters, downconverters, ICE Modems, and Baseband Processors present in such ICE embodiments. Including Baseband Processors as a component of an ICE embodiment enables the ICE Management System to exchange ICE M&C messages with the Baseband Processors, which simplifies and improves a user's management of baseband devices connected to remote terminals and hub earth station equipment.

In embodiments of the ICE invention equipped with a real-time, interactive M&C control path, such as an ICE ESC channel used by an Integrated ICE MES, or ICE M&C channel via a Packet M&C Device used by an Inmarsat-B ICE MES Retrofit, the ICE Management System can set transmit power and measure the resultant performance, then adjust transmit power to compensate for the remote terminal's location within the satellite footprint and minor pointing errors. Standard Services only perform power level adjustment between a hub earth station and a remote terminal during call set up negotiations. In ICE Services, power level adjustment is performed as part of call set up and can be performed periodically during the call or lease period. The procedure of power level adjustment between a hub earth station and a remote terminal is known in the art and typically measures the path performance in terms of bit error rate, carrier/noise, Eb/No, or some other quality factor, and then adjusts power, data rate, error correction, and/or modulation method to achieve the highest performance at the lowest power/bandwidth cost. These embodiments of the ICE invention equipped with a real-time M&C channel can also include dynamic selection of modulation method, dynamic allocation of carrier center frequencies and bandwidth, and dynamic selection of error correction methods. Such dynamic selection and allocation is known in the art and is managed and controlled by the ICE Management System through an exchange of ICE M&C messages between the ICE Server and embodiments of the ICE invention equipped with a real-time M&C channel.

Embodiments of the ICE invention are typically used in two-way, point to point traffic paths, as opposed to broadcast traffic paths. However, embodiments of the ICE invention can be used for one-way broadcast networks. In a one-way broadcast network, ICE Services originating from an ICE embodiment at an LES are uplinked at the LES and downlinked by a plurality of ICE-enabled remote terminals. The ICE M&C management system configures all ICE embodiments used in such a broadcast network to employ the same parameters for FEC, RS, modulation, etc. Traffic can be addressed to individual remote terminals in a broadcast network, or the same traffic can be sent to a group of, or all, remote terminals using methods well known in the art, such TDM, and frame relay.

Embodiments specific to satellite communications have been described above, but other embodiments of the ICE invention can be used in other environments in which microwave communications capacity is sold on a power/bandwidth basis. The ICE Management System not only supports the use of the ICE invention in Inmarsat and other microwave communications services, it can be used for secure authorization and configuration of a broad range of services and equipment. Applied to these services and equipment, the programmable satellite communications equipment controlled by the ICE Management System is replaced by programmable equipment used for or with such other services and equipment. At a minimum the ICE-enabled Terminal in these services and equipment requires input of ECCs (using a keypad, data port, or other input device) and output of EACs (using a display, data port, or other output device). For instance, the ICE Management System can be used in process engineering (e.g., pharmaceuticals, petroleum products, plastics manufacturing, etc.) where operators are required to change configurations, but for security, operator skill levels, or safety reasons it is better for the operator to lack direct control or even knowledge of the ingredients, formulation, parameters, or the product made. The ICE-enabled Terminals would be integral or associated with the process engineering equipment. Similarly, the ICE Management System can be used to securely reconfigure airborne, marine, and submarine autonomous vehicles, devices on terrestrial networks (e.g., routers, servers, trunk switches, edge devices, PBXs, multiplexers), and in surveillance and reconnaissance to protect operators from having knowledge or control over the types of data collected, data processing, and sources (especially for unattended, standalone monitoring stations that receive only periodic visits to exchange data storage units).

Those skilled in the art also will readily appreciate that many modifications to the invention are possible within the scope of the invention. Accordingly, the scope of the invention is not intended to be limited to the preferred embodiments described above, but only by the appended claims.

We claim:

1. A means for enabling a standard Inmarsat-B mobile earth station control unit (MCU) and an external satellite modem with an L-band interface to transmit using a single standard Inmarsat-B RF terminal on a mutually exclusive basis by the use of a diplexing means and by switches controlled by an embedded computer on a DSP board interfaced with the external satellite modem and the MCU, whereby the transmit source feeding the RF terminal is switched between the MCU and the external satellite modem by the embedded computer's setting of two switches, and wherein the MCU and external satellite modem can receive from the RF terminal regardless of which transmit source is connected to the RF terminal.

2. The apparatus of claim 1 in which higher data rates than are available with a standard MCU are obtained by the use of Viterbi FEC concatenated with Reed-Solomon error correction in the external satellite modem.

3. The apparatus of claim 1 in which higher data rates than are available with a standard MCU are obtained by the use of Turbo FEC in the external satellite modem.

4. The apparatus of claim 1 in which the MCU and RF terminal are Saturn B models.

5. The apparatus of 1 in which the external satellite modem is an EFData 300L.

6. The apparatus of claim 1 in which the embedded computer comprises a digital signal processor and non-volatile random access memory.

7. The apparatus of claim 1 further comprising a second identical apparatus of claim 1, a means for coupling the embedded computer of the second apparatus with embedded computer of the first apparatus, and in which the embedded computers use a means for determining which apparatus of the pair has better received signal quality at any given time, and select the apparatus with better signal quality to transmit at such time.

8. A diplexer/switch-based means for using an external satellite modem with a standard Inmarsat-B mobile earth station to provide transmission and reception at approximately 32 kbps of throughput per 25 kHz of bandwidth, further comprising a second identical diplexer/switch-based means, a means for coupling the second diplexer/switch-based means with the first diplexer/switch-based means, a means for determining which diplexer/switch-based means of the coupled pair has better received signal quality at any given time, and a means for permitting only the diplexer/switch-based means with better signal quality to transmit at such time.

9. An earth station for Inmarsat-B service, comprising:

a standard Inmarsat-B mobile earth station control unit (MCU) having a first satellite modem, a microcontroller executing an mobile earth station (MES) management program, a first EIA-232 port in communication with the MES management program, a diplexed L-band transmit/receive interface, and a software application programming interface (API) in the management program accessible through the EIA-232 interface, which API enables external control of a high power amplifier in an RF terminal by use of the API;

a standard Inmarsat-B RF terminal with L-band transmit/receive interface and a high power amplifier (HPA) that the MCU can control using management and control (M&C) messages multiplexed over an RF path connecting the MCU with the RF terminal;

a second satellite modem capable of providing higher data rate operation than the first satellite modem and equipped with L-band transmit and receive interfaces, a keypad and display, a microcontroller running a modem management program that controls the operation of the second satellite modem, keypad, and display, a baseband I/O port, a remote control EIA-232 port in communication with the modem management program; and a switching assembly associated with the second satellite modem and that contains a plurality of EIA-232 ports provided by a UART in communication with a switching management program running on a computer embedded in the switching assembly, an entry switch and an exit switch controlled by the embedded computer, a first M&C path between a first port on the UART and the EIA-232 port on the MCU, a second M&C path between a second port on the UART and the remote control EIA-232 port on the second satellite modem, two L-band diplexers, an entry connector connected to the diplexed L-band transmit/receive interface of the first satellite modem, an exit connector connected to the L-band transmit/receive interface of the RF terminal, NVRAM associated with the embedded computer as a data storage device, which switching management program interoperates with the MES management program through data exchange over the first M&C path and with the modem management program through data exchange on the second M&C path, provides a local user interface through the keypad and display on the second satellite modem, and based on data received and stored in NVRAM the switching management program controls the entry and exit switches to switch between:

a first path ("Bypass Path") on the switching assembly from the entry connector through entry and exit switches to the exit connector that passes signals from DC power to L-band with negligible attenuation, and a second RF path ("ICE path") on the switching assembly from the entry connector through the entry switch that connects with a first diplexer that terminates an entering transmitter L-band signal in a dummy load, and substitutes for the entering transmitter L-band signal the L-band transmitter output of the second satellite modem by connecting the L-band transmitter output of the second satellite modem with the transmit port of the second diplexer, which diplexes the second satellite modem transmit output into an RF path that passes through the exit switch to the exit connector, wherein the receive L-band path from the exit connector passes through the exit switch to the diplexed port of the second diplexer, out of the receive port of the second diplexer to the receive port of the first diplexer, out of the diplexed port of the first diplexer through the entry switch to the entry connector, and wherein the receive path is amplified and filtered so that it is virtually lossless compared with the receive signal strength at the entry connector when the first path is selected by the embedded computer, and wherein a directional coupler inserted in the RF path between the entry connector and the entry switch to provide a branch receive path that is filtered, amplified, and connected to the receive interface of the second satellite modem, and wherein DC power and an M&C frequency band pass through a first low pass filter connected to the entry connectors and a second low pass filter connected to the exit connector, thereby providing a DC power path and M&C path through the switching assembly when the second RF path is selected by the switching management program;

wherein the switching management program through communications with the modem management program and based on a configuration stored in NVRAM configures the second satellite modem to transmit and receive at data rates higher and lower than the data rate supported by the first satellite modem, controls the HPA power level through communications with the MES management program to set the HPA at the power level required by the configured data rate, and sets the entry and exit switches to insert the ICE Path so that the second satellite modem transmits and receives over the RF terminal.

10. The earth station of claim 9 in which higher data rates are obtained by the use of Viterbi FEC concatenated with Reed-Solomon error correction in the second satellite modem.

11. The earth station of claim 9 in which higher data rates are obtained by the use of Turbo FEC in the second satellite modem.

12. The earth station of claim 9 in which the MCU and RF terminal are Saturn B models.

13. The earth station of claim 9 in which the second satellite modem is an EFData 300L.

14. The earth station of claim 9 in which the first satellite modem and the second satellite modem have RF interfaces at intermediate frequencies in the range from 50 MHz to 300 MHz rather than at L-band, up/down converters are inserted in the RF path between the diplexed port of the second diplexer and the exit switch on the diplexer assembly, and the switching management program controls the operating intermediate frequencies of the second satellite modem during periods in which the RF path on the switching assembly is the ICE Path.

15. The earth station of claim 9 in which the branch receive path between the directional coupler and receive port of the second diplexer passes through a second coupler, which provides a second branch receive path that is filtered and amplified to provide a receive monitor port accessible at a connector on the switching assembly.

16. The earth station of claim 9 further comprising a second identical earth station of claim 9, a means for coupling the embedded computer of the second earth station with embedded computer of the first earth station, and in which the embedded computers use a means for determining which earth station of the pair has better received signal quality at any given time, and select the earth station with better signal quality to transmit at such time.

17. A satellite station, comprising:
a first modem capable of processing data at a first data rate;
a second modem capable of processing data at a second data rate and subjecting the data to first and second error correction schemes; and
a microprocessor coupled to the first and second modems and configured to operate management and control programming to direct data processing of the first and second modems;
wherein the first and second error correction schemes are manipulated so that the second data rate is faster than the first data rate.

18. The satellite station of claim 17, wherein the station operates as a transmitting station.

19. The satellite station of claim 17, wherein the station operates as a receiving station.

20. The satellite station of claim 17, wherein the first error correction scheme is forward error correction.

21. The satellite station of claim 17, wherein the forward error correction is Turbo forward error correction.

22. The satellite station of claim 17, wherein the second error correction scheme is Reed-Solomon error correction.

23. The satellite station of claim 17, wherein a network management system associated with the station includes a standalone management and control system.

24. The satellite station of claim 17, wherein a power amplifier of the station is driven with a constant envelope waveform.

25. The satellite station of claim 17, coupling with at least one additional satellite station, wherein the plurality of stations share bandwidth, and at least one of the stations provides for asymmetric data processing.

26. A method of operating a satellite station, comprising:
processing data through a first modem at a first data rate;
processing data through a second modem at a second data rate and subjecting the data to first and second error correction schemes; and
executing a microprocessor coupled to the first and second modems and configured to operate management and control programming to direct data processing of the first and second modems;
wherein the first and second error correction schemes are manipulated so that the second data rate is faster than the first data rate.

27. The satellite station of claim 17, further comprising said second data rate being faster than the first data rate due to at least the subjecting the data to first and second error correction schemes.

28. The satellite station of claim 27, wherein the first error correction scheme is forward error correction.

29. The satellite station of claim 27, wherein the forward error correction is Reed-Solomon error correction.

30. The method of claim 26, further comprising said second data rate being faster than the first data rate due to at least the subjecting the data to first and second error correction schemes.

31. The method of claim 30, wherein the first error correction scheme is forward error correction.

32. The method of claim 30, wherein the forward error correction is Reed-Solomon error correction.

* * * * *